US011929219B2

(12) United States Patent
Balog et al.

(10) Patent No.: US 11,929,219 B2
(45) Date of Patent: *Mar. 12, 2024

(54) SHAPE MEMORY ALLOY ACTUATED SWITCH

(71) Applicant: Qatar Foundation for Education, Science and Community Development, Doha (QA)

(72) Inventors: Robert S. Balog, Doha (QA); Ibrahim Karaman, Doha (QA); Moustafa Tawfik Omar Raslan, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 12 days.

This patent is subject to a terminal disclaimer.

(21) Appl. No.: 17/994,938

(22) Filed: Nov. 28, 2022

(65) Prior Publication Data
US 2023/0090594 A1    Mar. 23, 2023

Related U.S. Application Data

(62) Division of application No. 16/942,381, filed on Jul. 29, 2020, now Pat. No. 11,515,101.

(Continued)

(51) Int. Cl.
*H01H 37/32* (2006.01)
*F03G 7/06* (2006.01)
(Continued)

(52) U.S. Cl.
CPC ......... *H01H 37/323* (2013.01); *F03G 7/0614* (2021.08); *H01H 1/06* (2013.01); *H01H 1/56* (2013.01); *H01H 3/38* (2013.01)

(58) Field of Classification Search
CPC .. H01H 3/38; H01H 1/06; H01H 1/56; H01H 47/26; H01H 61/06; H01H 37/46; H01H 37/52; F03G 7/065
(Continued)

(56) References Cited

U.S. PATENT DOCUMENTS 4,544,988 A * 10/1985 Hochstein .......... H01H 61/0107
337/140
5,127,228 A     7/1992 Swenson
(Continued)

FOREIGN PATENT DOCUMENTS

DE      102016108627 A1    11/2017
WO        2013061234 A1     5/2013
(Continued)

*Primary Examiner* — Renee S Luebke
*Assistant Examiner* — Iman Malakooti
(74) *Attorney, Agent, or Firm* — K&L Gates LLP

(57) ABSTRACT

A shape-memory alloy actuated switch (SMAAS) is provided that enables the stable switching of two separate circuits. The presently disclosed SMAAS includes a substrate, one or more electrical contacts attached to the substrate for connecting to load circuits, and one or more electrically conductive elements for selectively connecting the one or more electrical contacts. The disclosed SMAAS also includes one or more shape-memory alloy actuators attached to the substrate. The one or more shape-memory alloy actuators are configured to move the one or more electrically conductive elements. The shape-memory alloy actuators are self-heated by passing current through the shape-memory alloy material. The disclosed SMAAS may also include electrical contacts to connect an external control current to the shape-memory alloy material. In some examples, the provided SMAAS includes one or more retention mechanisms to prevent movement of the electrically conductive elements after actuation.

20 Claims, 17 Drawing Sheets

Related U.S. Application Data

(60) Provisional application No. 62/879,751, filed on Jul. 29, 2019.

(51) Int. Cl.
    *H01H 1/06*       (2006.01)
    *H01H 1/56*       (2006.01)
    *H01H 3/38*       (2006.01)

(58) Field of Classification Search
    USPC .......................... 200/238; 337/139, 140, 393
    See application file for complete search history.

(56) References Cited

U.S. PATENT DOCUMENTS

| | | |
|---|---|---|
| 5,977,858 A | 11/1999 | Morgen et al. |
| 6,133,816 A | 10/2000 | Barnes et al. |
| 6,236,300 B1 | 5/2001 | Minners |
| 6,762,669 B2 | 7/2004 | Alacqua et al. |
| 6,917,276 B1 | 7/2005 | Menard et al. |
| 7,852,190 B1 | 12/2010 | Woychik et al. |
| 7,928,826 B1 | 4/2011 | Woychik et al. |
| 11,515,101 B2 * | 11/2022 | Balog .................... F03G 7/065 |
| 2015/0048921 A1 | 2/2015 | Alacqua et al. |

FOREIGN PATENT DOCUMENTS

| | | |
|---|---|---|
| WO | 20160168295 A1 | 10/2016 |
| WO | 2017194591 A1 | 11/2017 |

\* cited by examiner

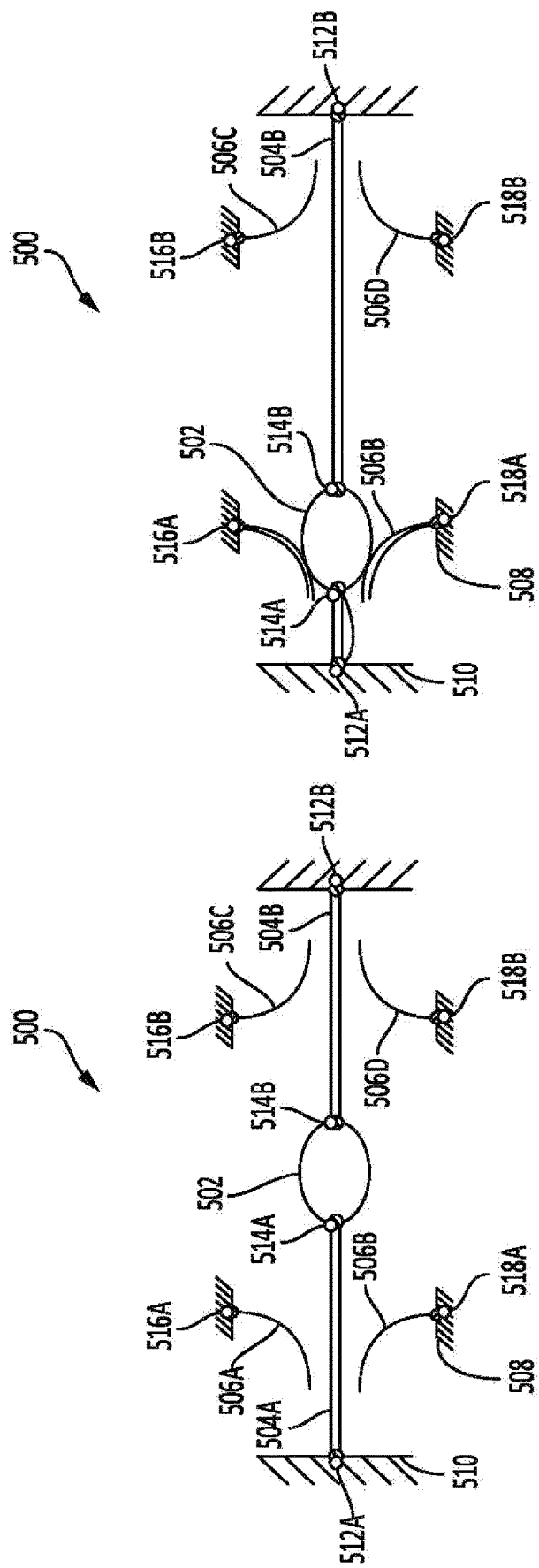

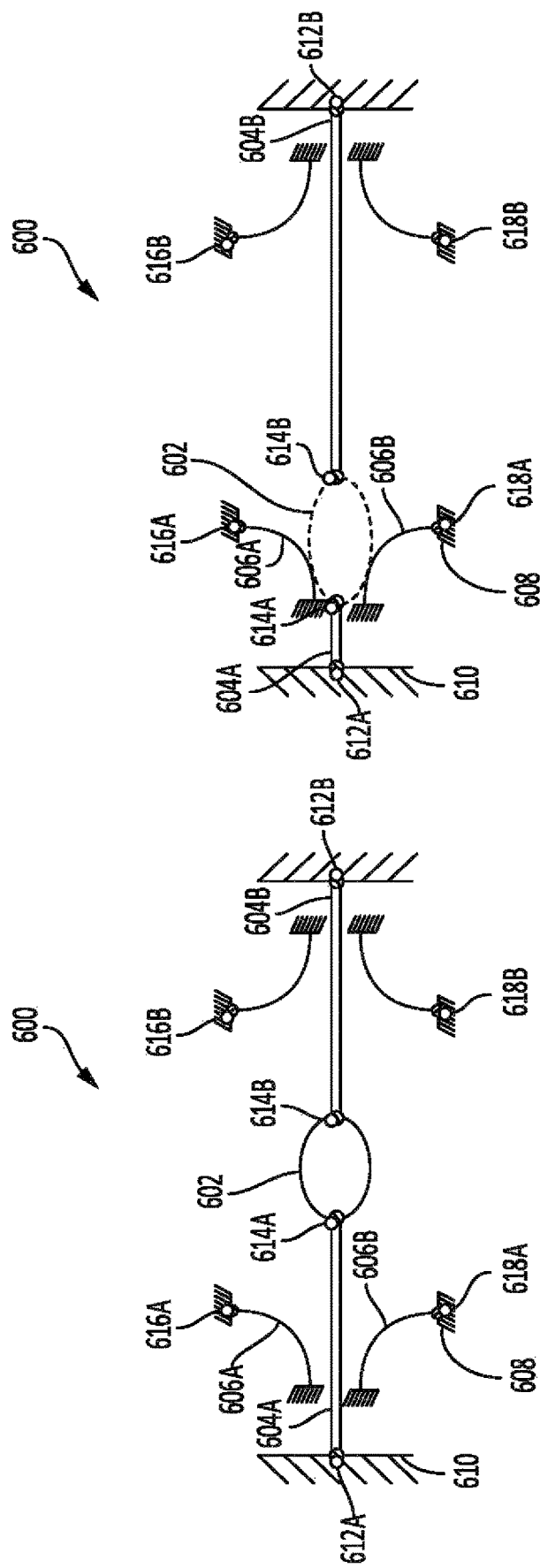

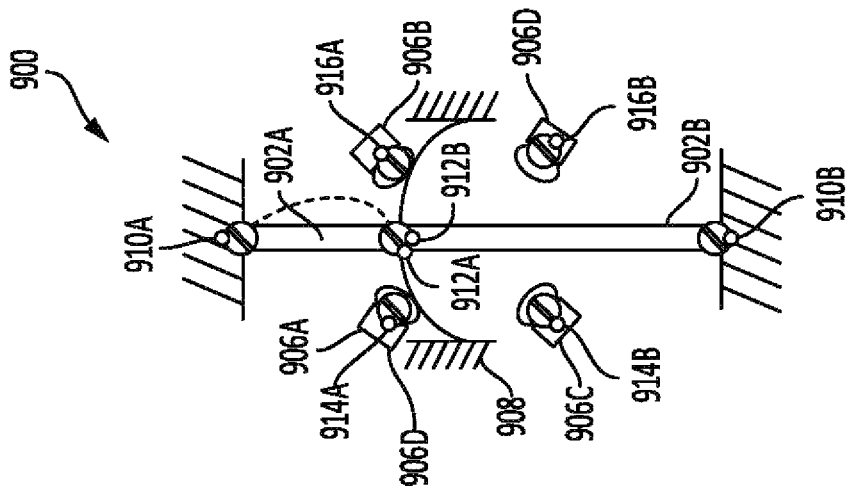
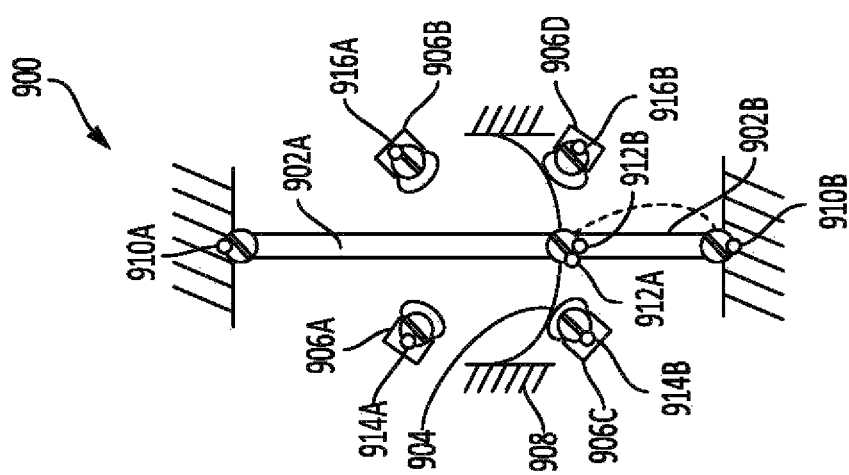

SHAPE MEMORY ALLOY ACTUATED SWITCH

CROSS REFERENCE TO RELATED APPLICATIONS

The present application is a divisional application based on U.S. Ser. No. 16/942,381, filed on Jul. 29, 2020 which claims priority to U.S. Ser. No. 62/879,751, filed Jul. 29, 2019, the entire contents of which are being incorporated herein by reference.

BACKGROUND

Shape memory alloys (SMAs) are smart materials that can be set to a specific shape and remember this shape even after undergoing a plastic deformation at a low temperature. Heating SMAs above a certain temperature, termed the austenitic transformation temperature, forces the material to return to its original set shape. A significant force is generated by the material while reverting shape. SMAs are a part of a family of materials called active materials that change properties as a response to external stimulation.

Activating SMAs can be through heating by an external heat source or internally by ohmic heating (passing current through the materials and using its internal resistance to generate heat). Once SMAs reverse shape, the heat source can be disconnected and the material holds its shape or state. Recoverable deformation of SMAs can be in the form of axial extension/straining, bending or torsion.

An electrical switch is a device that connects one or more electrical inputs to one or more electrical outputs. These connections may carry current to transmit electrical power or may carry a signal to transmit information. Electrical control means that electricity in the form of a voltage or current is used to change the configuration of the switch. The configuration that a switch is in is commonly called a switch state. The most basic switch configuration, commonly known as a single-pole single-throw (SPST), has one input and one output and two possible states: on or off.

Electrically-operated electrical switches are either mechanical (e.g. electromagnetic relays—EMRs) or electronic (e.g solid state Relays—SSRs) or hybrid (e.g.Hybrid Solid State Relay—HSSRs). Electromagnetic relays rely on current passing through a coil to create a magnetic field which generates a force to open or close metallic contacts. Electronic switches are referred to as solid-state relays because they typically use semiconductor components (e.g.Transistors, Thyristor, TRIAL, etc.) instead of moving parts to turn on or turn off the flow of current in the output circuit. The hybrid relays employ a parallel combination of SSRs and EMRs.

A drawback associated with some typical electromagnetic relays and some typical semiconductor switches is that they require a holding power to maintain the switch state. Typical semiconductor switches also have the additional drawback of more power losses across the junctions when compared to metallic contactors since the contact resistance of semiconductor junctions is an order of magnitude higher than that of metal contactors. In light of these drawbacks, a need exists for an electrically-operated electric switch that reduces or eliminates the holding power requirement and reduces losses during switching as compared to typical electrically-operated electric switches.

SUMMARY

The present disclosure provides for a shape memory alloy actuated switch (SMAAS) with a shape-memory alloy that is used as a pulse power load to briefly alter the physical characteristics of the shape-memory alloy in a way that enables the metallic switch contact to change state. The presently disclosed SMAAS combines electric control properties with the low power loss of an ohmic, metallic contact electrical switch. The shape-memory alloy of the SMAAS only consumes power when changing switch state so there is no holding current needed to maintain a switch state. The presently disclosed SMAAS includes a shape-memory alloy arranged in a protagonist-antagonist configuration. The protagonist-antagonist configuration may enable stable switching in two separate circuits.

In one aspect of the present disclosure, an SMAAS includes a substrate, one or more electrical contacts attached to the substrate for connecting to load circuits, and one or more electrically conductive elements for selectively connecting the one or more electrical contacts. The SMAAS also includes one or more shape-memory alloy actuators attached to the substrate. The one or more shape-memory alloy actuators are configured to move the one or more electrically conductive elements. The shape-memory alloy actuators are self-heated by passing current through the shape-memory alloy material. The SMAAS may also include electrical contacts to connect an external control current to the shape-memory alloy material. In some aspects, the SMAAS includes one or more retention mechanisms to prevent movement of the electrically conductive elements after actuation.

BRIEF DESCRIPTION OF THE DRAWINGS

FIGS. 5A and 5B illustrate cross-sectional top view schematics of an example combined translational, deformational SMAAS configuration, according to an embodiment of the present disclosure.

FIGS. 6A and 6B illustrate cross-sectional top view schematics of an example combined translational, deformational SMAAS configuration, according to an embodiment of the present disclosure.

FIGS. 9A and 9B illustrate cross-sectional top view schematics of an example combined translational, deformational SMAAS configuration, according to an embodiment of the present disclosure.

DETAILED DESCRIPTION

Figure 1:
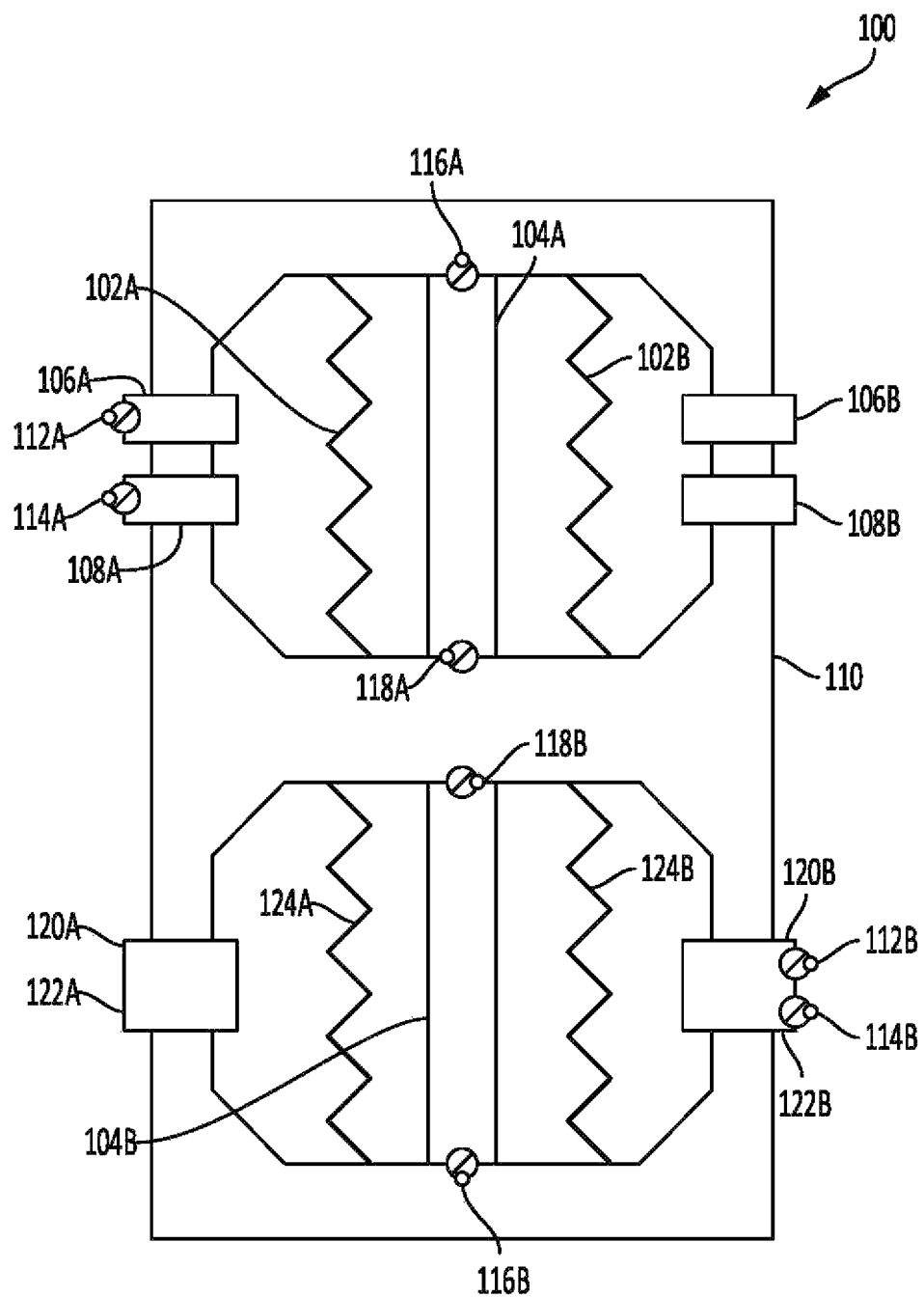
FIG. 1 illustrates a cross-sectional cross-sectional top view schematic of an example translation, spring biased SMAAS configuration, according to an embodiment of the present disclosure.

The present disclosure provides for a shape-memory alloy actuated switch (SMAAS) with shape-memory alloy (SMA) elements that are used as a pulse power load to briefly alter the physical characteristics of the shape-memory alloy in a way that enables the metallic switch contacts to change state. The provided SMAAS enables the switching of two separate circuits. In various instances, such switching may be stable due to a retention mechanism in the SMAAS. The presently disclosed SMAAS combines electric control properties with the low power loss of an ohmic, metallic contact electrical switch. The SMA elements of the provided SMAAS only consume power when changing switch state so there is no holding current needed to maintain a switch state. Accordingly, the SMAAS may be more efficient than a typical semiconductor switch used for the same purpose because the contact resistance of the metal-to-metal switch in the provided SMAAS is at least three orders of magnitude less than the effective resistance of a semiconductor used as a switch. In various instances, the provided SMAAS also does not require holding current (power) to keep it in the on-state, unlike a semiconductor switch.

The presently disclosed SMAAS includes a substrate, one or more electrical contacts attached to the substrate for connecting to load circuits, and one or more electrically conductive elements for selectively connecting the one or more electrical contacts. For example, a first set of electrical contacts may be connected to a first load circuit, while a second set of electrical contacts may be connected to a second load circuit. The disclosed SMAAS also includes one or more SMA actuators. The actuators may be partially attached to the substrate. The one or more SMA actuators are configured to move the electrically conductive element(s) For instance, the SMA actuators may move the electrically conductive element(s) so that it contacts the first set or the second set of electrical contacts in order to close the first or second load circuit, respectively. In various instances, the SMA actuators may be positioned within guide rails on the substrate.

The SMA actuators are self-heated by passing a control current through the SMA material. The disclosed SMAAS may include electrical contacts to connect an external control current to the shape-memory alloy material. The control current may be separated from the current in the external circuits being switched. In some examples, the provided SMAAS enables the application of pulsed electrical current to briefly self-heat one or more SMA wires. In some examples, the provided SMAAS may be suitable for miniaturization using planar MEMS fabrication.

In some examples, the substrate may be constructed or may include silicon. In other examples, the disclosed SMAAS includes a substrate that includes glass or another suitable material with high mechanical strength, low friction, and that is electrically and thermally insulating. In some examples, the substrate is coated using PTFE for friction reduction and electrical insulation. The various components described herein may be at least partially attached to the substrate. Some components are fixed in place on the substrate. Other components are fixed to the substrate at a point such that such other components may translate relative to the substrate. The one or more shape-memory alloy actuators may be constructed of nickel titanium (i.e., nitinol). In other examples, the one or more SMA actuators may be constructed of or may include copper-aluminum-nickel or another suitable shape-memory alloy material that exhibits a one-way shape memory effect and has a transformation temperature above 80 degrees Celsius.

In some examples, the one or more electrically conductive elements may be constructed of aluminum. In other examples, the one or more electrically conductive elements may be constructed of or include copper, gold, or another suitable material with high mechanical strength, low friction, and that is electrically conductive. In some examples, the electrically conductive element(s) is coupled to the SMA actuator(s) using an adhesive after the electrically conductive element(s) is pre-strained. In such examples, the SMA-electrically conductive element subassembly may be coupled to the substrate using electroplated micro-rivets. In various instances, the electrically conductive element(s) may be a conductive plunger, a conductive wire, or one or more separate conductive contacts.

The electrical contacts of the disclosed SMAAS may be constructed of or may include aluminum. In other examples, the disclosed SMAAS includes electrical contacts that are constructed of or include gold or other suitable materials that are moderately elastic with a high fracture strength, electrically conductive, and that have high friction. In some examples, the electrical contacts are coupled to the substrate using micro-rivets. In some examples, the disclosed SMAAS includes a casing. The casing may include an epoxy. In other examples, the SMAAS may include components constructed of other suitable materials such as thermally moldable plastics that are thermally and mechanically stable, electrically insulating, and have a high impact strength.

In various instances, the provided SMAAS includes at least two SMA actuators that are arranged in a protagonist-antagonist configuration, as will be discussed in more detail below in connection with the figures. The protagonist-antagonist configuration enables stable switching of at least two separate circuits with one switch when the SMA actuator(s) change shape upon heating. In some configurations, the SMAAS may include a retention mechanism that enables the SMAAS to be bi-stable or tri-stable (or more) without requiring holding power Stated differently, the retention mechanism maintains the SMAAS in a certain switch state after the SMA actuator(s) change shape. In some examples, the protagonist-antagonist configuration includes one SMA member. In other examples, this configuration includes two or more separate SMA members Examples of suitable protagonist-antagonist configurations of SMA members are illustrated in the figures. The provided SMAAS may, however, take other suitable configurations than those illustrated. For example, modifications may be made to enable switching of more than two separate circuits as will be appreciated by one having skill in the art. All of the example configurations illustrated in the figures enable switching of two separate circuits with one switch.

FIG. 1 illustrates a cross-sectional top view schematic of an example SMAAS 100. The SMAAS 100 is an example translational, spring-biased configuration of the present disclosure. The configuration provides for a linearly-actuated rail 110 that may control the switching of two separate circuits via the SMA actuators 104A, 104B. The SMA actuators 104A, 104B may be strips of SMA material. The SMA actuator 104A moves against bias springs 102A and 102B to close the electrical contacts 106A, 106B with the electrical contacts 108A, 108B The electrical contacts 106A, 106B, 108A, 108B are embedded in or connected to the rail 110. In the illustrated example, the electrical contacts 106A and 106B are shown open from the electrical contacts 108A and 108B. The SMA actuator 104B moves against bias springs 124A and 124B to close the electrical contacts 120A, 120B with the electrical contacts 122A, 122B. The electrical contacts 120A, 120B, 122A, 122B are embedded in or connected to the rail 110. In the illustrated example, the electrical contacts 120A and 120B are shown closed with the electrical contacts 122A and 122B.

The example SMAAS 100 may include positive power signal terminals 112A and 112B and negative power signal terminals 114A and 114B for connecting to two separate circuits, respectively. The example SMAAS 100 may include positive control signal terminals 116A and 116B and negative control signal terminals 118A and 118B for supplying current to the SMA actuators 104A and 104B, respectively. The supplied control current actuates the SMA actuator 104A or 104B, causing the SMA actuator 104A or 104B to change shape (e.g., lengthen or shorten or otherwise deform), which controls whether a circuit is opened or closed. For instance, supplying current through the SMA actuator 104A via the positive control signal terminal 116A and the negative control signal terminal 118A may cause the SMA actuator 104A to shorten, which closes the electrical contacts 106A and 106B with the electrical contacts 108A and 108B The same applies for the SMA actuator 104B. The SMAAS 100 therefore enables switching of two separate circuits.

Figure 2:
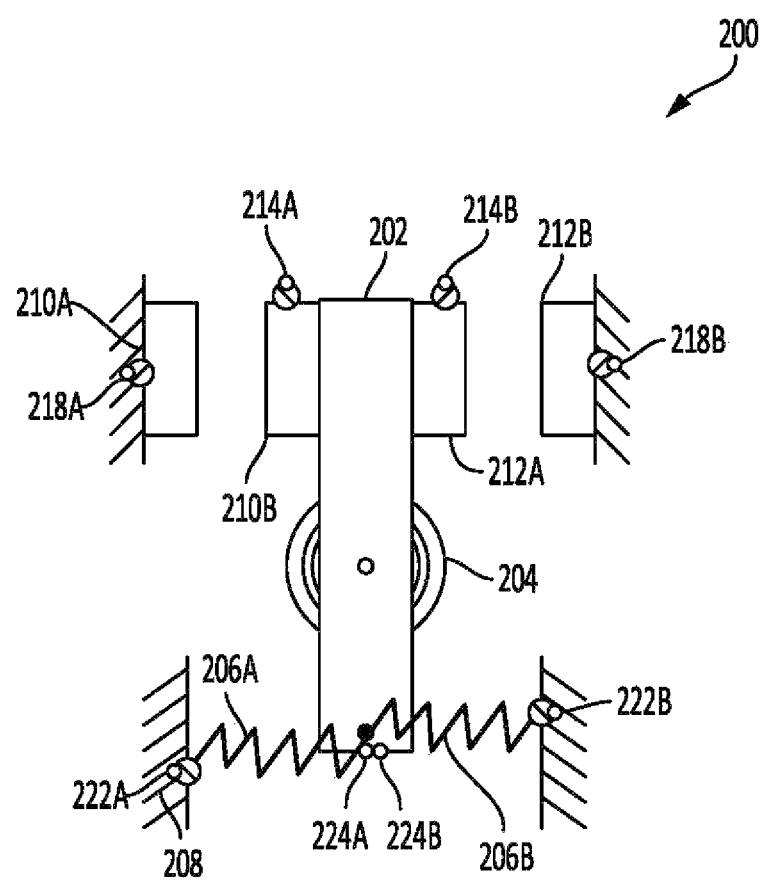
FIG. 2 illustrates a cross-sectional cross-sectional top view schematic of an example rotational, torsional, spring-loaded lever SMAAS configuration, according to an embodiment of the present disclosure.

FIG. 2 illustrates a cross-sectional top view schematic of an example SMAAS 200. The SMAAS 200 is an example rotational, spring-loaded lever configuration of the present disclosure. The configuration of the SMAAS 200 provides for a switch with three separate operation modes. The SMAAS 200 includes a lever arm 202 that is controlled by a torsional spring 204 and two SMA actuators 206A and 206B The SMA actuators 206A and 206B may be springs constructed of a SMA material. One end of the SMA actuator 206A is fixed to the lever arm 202 and, the opposite end is fixed to a support (e.g., a substrate). One end of the SMA actuator 206B is fixed to the lever arm 202 and the opposite end is fixed to the substrate). The torsional spring 204 may also be fixed to the substrate. Electrical contacts 210B and 212A may be attached to opposing sides of the lever arm 202 as illustrated. Electrical contacts 210A and 212B may be fixed to the substrate.

The example SMAAS 200 may include positive power signal terminals 218A and 218B and negative power signal terminals 214A and 214B for connecting to two separate circuits, respectively. The example SMAAS 200 may include positive control signal terminals 222A and 222B and negative control signal terminals 118A and 118B for supplying current to the SMA actuators 206A and 206B, respectively. The supplied control current actuates the SMA actuator 206A or 206B, causing the SMA actuator 206A or 206B to change shape (e.g., lengthen or shorten or otherwise deform), which controls whether a circuit is opened or closed. The SMAAS 200 provides three states of operation.

For instance, supplying current through the SMA actuator 206A via the positive control signal terminal 222A and the negative control signal terminal 224A may cause the SMA actuator 206A to shorten. The shortened SMA actuator 206A rotates the lever arm 202 about the torsional spring 204, which causes the electrical contact 212A to contact the electrical contact 212B The circuit attached at the positive power signal terminal 218B and the negative power signal terminal 214B is thereby closed. This may constitute a first state of the SMAAS 200. If instead the SMA actuator 206B is actuated, then the lever arm 202 is rotated about the torsional spring 204 so that the electrical contact 210B contacts the electrical contact 210A. Such contact closes the circuit attached at the positive power signal terminal 218A and the negative power signal terminal 214A. This may constitute a second state of the SMAAS 200. Actuating the SMA actuator 206B while the SMAAS 200 is in the first state may overcome tension in the SMA actuator 206A to reach the second state.

A third state of the SMAAS 200 may be when, as illustrated, none of the electrical contacts 210A, 210B, 212A, 212B are in contact with one another. The torsional spring 204 enables the third, neutral state as compared to other examples herein. In some examples, actuating the SMA actuators 206A and 206B may cause them to lengthen rather than shorten. In such examples, it will be appreciated that actuating the SMA actuator 206A or 206B will close the opposite circuit as described above. In some aspects, the SMAAS 200 may include a retention mechanism described herein that makes the configuration tri-stable.

Figure 3B:
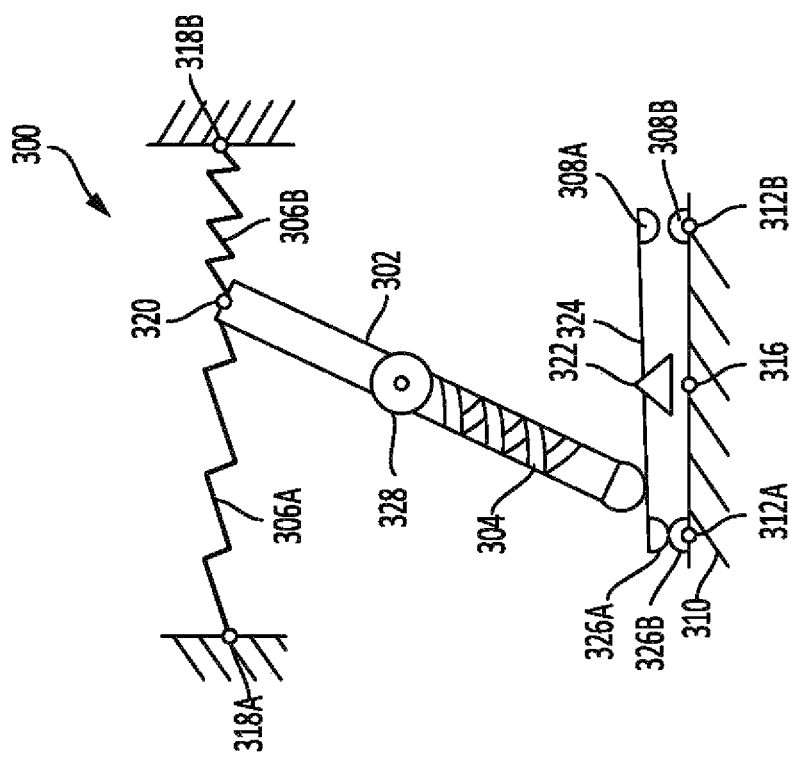
FIGS. 3A and 3B illustrate cross-sectional cross-sectional top view schematics of an example rotational, helical, spring-loaded lever SMAAS configuration, according to an embodiment of the present disclosure.
Figure 3A:
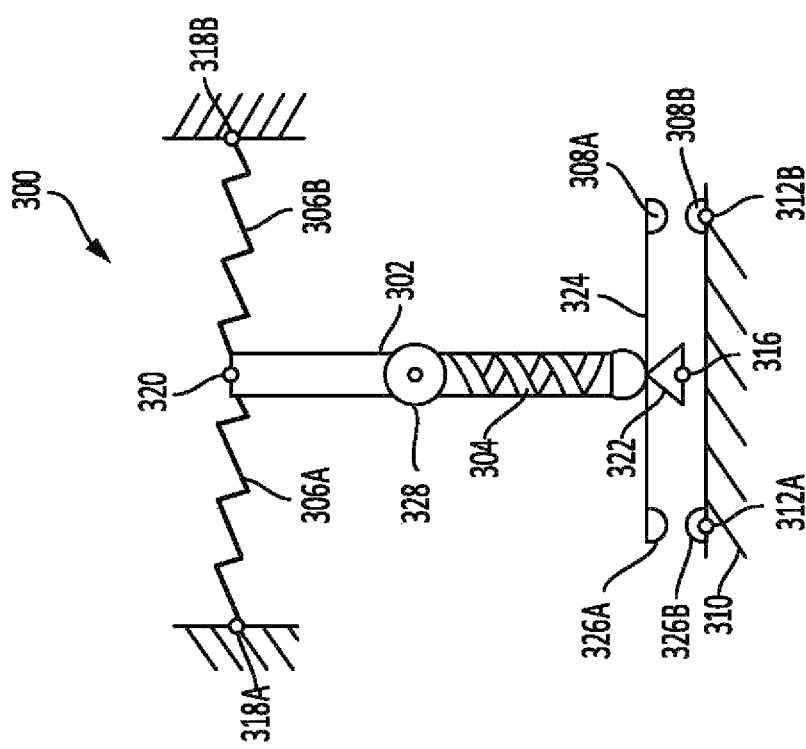

FIGS. 3A and 3B illustrate cross-sectional top view schematics of an example SMAAS 300. The SMAAS 300 is an example rotational, spring-loaded lever configuration of the present disclosure. The SMAAS 300 includes a lever arm 302 actuated by two SMA actuators 306A and 306B. The lever arm 302 may be fixed to a substrate at a rotation point 328. At least a portion of the lever arm 302 includes a spring 304. The SMA actuators 306A and 306B are arranged opposite to each other on a proximal end of the lever arm 302. The SMA actuators 306A and 306B may be springs constructed of a SMA material. The distal end of the lever arm 302 is in contact with a bar 324. The bar 324 is in contact with, and may be connected to, a fulcrum 322 at approximately the center of the bar 324. Electrical contacts 308A and 326A are connected to the bar 324. Electrical contacts 308B and 326 may be fixed to a substrate 310.

The example SMAAS 300 may include positive power signal terminals 312A and 312B and negative power signal terminal 316 for connecting to two separate circuits, respectively. The example SMAAS 300 may include positive control signal terminals 318A and 318B and a negative control signal terminal 320 for supplying current to the SMA actuators 306A and 306B, respectively. The supplied control current actuates the SMA actuator 306A or 306B, causing the SMA actuator 306A or 306B to change shape (e.g., lengthen or shorten or otherwise deform), which controls whether a circuit is opened or closed. The example SMAAS 300 includes two states of operation. FIG. 3A illustrates a neutral, manufactured position of the lever arm 302 prior to the SMAAS 300 being actuated into one of its two possible states.

For instance, supplying current through the SMA actuator 306A via the positive control signal terminal 318B and the negative control signal terminal 320 may cause the SMA actuator 306B to shorten. The shortened SMA actuator 306B rotates the lever arm 302 about the rotation point 328, causing the distal end of the lever arm 302 to translate along the bar 324 towards the electrical contact 326A. As the distal end of the lever arm 302 translates along the bar 324, the spring 304 lengthens, which causes the lever arm 302 to apply pressure to the bar 324 and force the electrical contact 326A to contact the electrical contact 326B, as illustrated in FIG. 3B. The circuit attached at the positive power signal terminal 312A and the negative power signal terminal 316 is thereby closed. This may constitute a first state of the SMAAS 300.

The spring 304 additionally provides a retention mechanism for the SMAAS 300. For instance, in the first state illustrated in FIG. 3B, in order for the lever arm 302 to rotate such that it no longer forces the electrical contact 326A to contact the electrical contact 326B, the compression force of the spring 304 must be overcome. The spring 304 therefore retains the the SMAAS 300 in its first state until that compression force of the spring 304 is overcome. To overcome the compression force, the SMA actuator 306A may be actuated.

Actuating the SMA actuator 306A rotates the lever arm 302 about the rotation point 328 causing the distal end of the lever arm 302 to translate along the bar 324 towards the electrical contact 308A. Once the distal end of the lever arm 302 is translated to the electrical contact 308A, the lever arm 302 applies pressure to the bar 324 and forces the electrical contact 308A to contact the electrical contact 308B. The circuit attached at the positive power signal terminal 312B and the negative power signal terminal 316 is thereby closed. This may constitute a second state of the SMAAS 300. The spring 304 maintains the lever arm 302 in this position until the SMA actuator 306B is actuated.

In some examples, actuating the SMA actuators 306A and 306B may cause them to lengthen rather than shorten. In such examples, it will be appreciated that actuating the SMA actuator 306A or 306B will close the opposite circuit as described above.

Figure 4B:
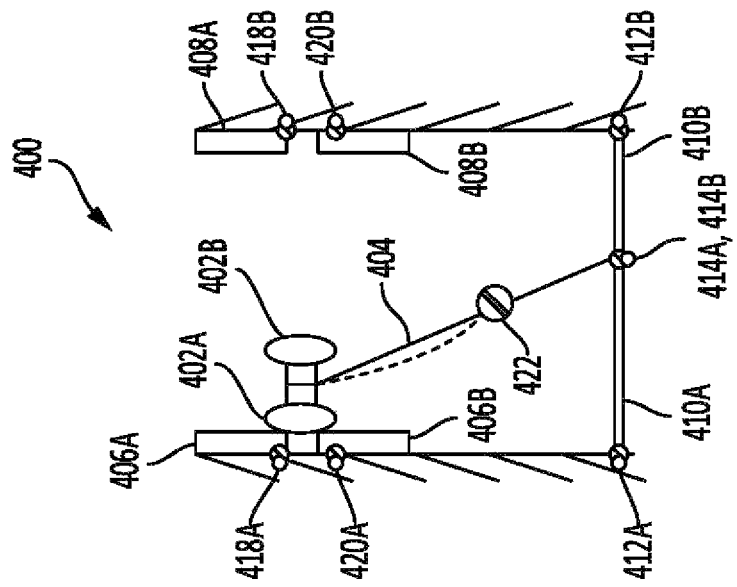
FIGS. 4A and 4B illustrate cross-sectional top view schematics of an example combined rotational, deformational SMAAS configuration, according to an embodiment of the present disclosure.
Figure 4A:
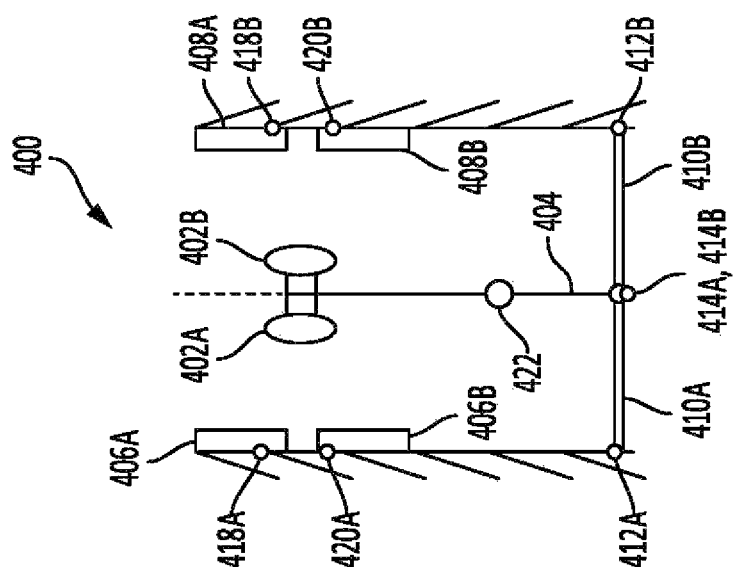

FIGS. 4A and 4B illustrate cross-sectional top view schematics of an example SMAAS 400. The example SMAAS 400 is an example combined rotational and deformational configuration of the present disclosure. The SMAAS 400 includes a lever arm 404. The lever arm 404 may be flexible such that it may be elastically deformed. The lever arm 404 may be fixed to a substrate at a rotation point 422. The proximal end of the lever arm 404 includes electrical contacts 402A and 402B. The SMAAS 400 also includes electrical contacts 406A, 406B, 408A, and 408B that a fixed to the substrate. The lever arm 404 is connected at its proximal end to two competing SMA actuators 410A and 410B. The SMA actuators 410A and 410B may be springs or wires constructed of a shape-memory material.

The example SMAAS 400 may include positive power signal terminals 418A and 418B and negative power signal terminals 420A and 420B for connecting to two separate circuits, respectively. The example SMAAS 400 may include positive control signal terminals 412A and 412B and a negative control signal terminals 414A and 414B for supplying current to the SMA actuators 410A and 410B, respectively. The supplied control current actuates the SMA actuator 410A or 410B, causing the SMA actuator 410A or 410B to change shape (e.g., lengthen or shorten or otherwise deform), which controls whether a circuit is opened or closed. The example SMAAS 400 includes two states of operation. FIG. 4A illustrates a neutral, manufactured position of the lever arm 402 prior to the SMAAS 400 being actuated into one of its two possible states.

For instance, supplying current through the SMA actuator 410B via the positive control signal terminal 412B and the negative control signal terminal 414B may cause the SMA actuator 410B to shorten. The shortened SMA actuator 410B rotates the lever arm 404 about the rotation point 422, causing the distal end of the lever arm 404 to translate the electrical contact 402A to contact the electrical contacts 406A and 406B, as illustrated in FIG. 4B. The circuit attached at the positive power signal terminal 418A and the negative power signal terminal 420A is thereby closed. This may constitute a first state of the SMAAS 400.

Deformation of the lever arm 404, illustrated by the dashed line in FIG. 4B, produces a force that maintains strong contact between the electrical contact 402A and the electrical contacts 406A and 406B. The restoring energy from the deformation of the lever arm 404 overcomes the relaxation stress in the SMA actuator 410B. The produced force from the lever arm 404 therefore provides a retention mechanism that maintains the SMAAS 400 in an actuated state. To overcome the deformation force, the SMA actuator 410A may be actuated.

Actuating the SMA actuator 410A rotates the lever arm 404 about the rotation point 422 causing the distal end of the lever arm 404 to translate the electrical contact 402B to contact the electrical contacts 408A and 408B. The circuit attached at the positive power signal terminal 418B and the negative power signal terminal 420B is thereby closed. This may constitute a second state of the SMAAS 400. The lever arm 404 may deform to maintain the lever arm 404 in this position, as described above, until the SMA actuator 410B is actuated.

In some examples, actuating the SMA actuators 410A and 410B may cause them to lengthen rather than shorten. In such examples, it will be appreciated that actuating the SMA actuator 410A or 410B will close the opposite circuit as described above.

FIGS. 5A and 5B illustrate cross-sectional top view schematics of an example SMAAS 500. The SMAAS 500 is an example combined translational and deformational configuration of the present disclosure. The SMAAS 500 includes a metal, conductive plunger 502. The plunger 502 may be sphere-shaped or egg-shaped. The plunger 502 is connected at its proximal end to a SMA actuator 504A and at its distal end to a SMA actuator 504B The SMA actuators 504A and 504B are fixedly connected to a substrate at their ends opposite the plunger 502. The SMA actuators 504A and 504B may be springs or wires constructed of a shape-memory material.

The SMAAS 500 also includes electrical contacts 506A, 506B, 506C, and 506D that are each fixed to the substrate on one of their ends. The electrical contacts 506A, 506B, 506C, and 506D are flexible or elastically deformable. A distance between the electrical contacts 506A and 506B and between the electrical contacts 506C and 506D is shorter than a width of the plunger 502. Therefore, when the plunger 502 is positioned between the electrical contacts 506A and 506B or between the electrical contacts 506C and 506D, the plunger 502 causes the electrical contacts 506A and 506B or the electrical contacts 506C and 506D to deform.

The example SMAAS 500 may include positive power signal terminals 516A and 516B and negative power signal terminals 518A and 518B for connecting to two separate circuits, respectively. The example SMAAS 500 may include positive control signal terminals 512A and 512B and a negative control signal terminals 514A and 514B for supplying current to the SMA actuators 504A and 504B, respectively. The supplied control current actuates the SMA actuator 504A or 504B, causing the SMA actuator 504A or 504B to change shape (e.g., lengthen or shorten or otherwise deform), which controls whether a circuit is opened or closed. The example SMAAS 500 includes two states of operation. FIG. 5A illustrates a neutral, manufactured position of the plunger 502 prior to the SMAAS 500 being actuated into one of its two possible states.

For instance, supplying current through the SMA actuator 504A via the positive control signal terminal 512A and the negative control signal terminal 514A may cause the SMA actuator 504A to shorten or deform as illustrated by the dashed line in FIG. 5B. The deformed SMA actuator 504B translates the conductive plunger 502 between the electrical contacts 506A and 506B, as illustrated in FIG. 5B. The circuit attached at the positive power signal terminal 516A and the negative power signal terminal 518A is thereby closed. This may constitute a first state of the SMAAS 500.

Deformation of the electrical contacts 506A and 506B, illustrated by the dashed lines in FIG. 5B, produces a force that maintains strong contact between the electrical contacts 506A and 506B and the plunger 502. The restorative energy from the elastic deformation of the electrical contacts 506A and 506B applies pressure to the plunger 502 that maintains the plunger 502 in place. The produced force from the electrical contacts 506A and 506B therefore provides a retention mechanism that maintains the SMAAS 500 in an actuated state. To overcome the force of the electrical contacts 506A and 506B, the SMA actuator 504B may be actuated.

Actuating the SMA actuator 504B translates the conductive plunger 502 between the electrical contacts 506C and 506D. The circuit attached at the positive power signal terminal 516B and the negative power signal terminal 518B is thereby closed. This may constitute a second state of the SMAAS 500. The electrical contacts 506C and 506D may elastically deform to maintain the plunger 502 in this position, as described above, until the SMA actuator 504A is actuated.

In some examples, actuating the SMA actuators 504A and 504B may cause them to lengthen rather than shorten. In such examples, it will be appreciated that actuating the SMA actuator 504A or 504B will close the opposite circuit as described above.

FIGS. 6A and 6B illustrate cross-sectional top view schematics of an example SMAAS 600. The SMAAS 600 is the same as the example SMAAS 500 except that instead of elastically deformable electrical contacts, the SMAAS 600 includes an elastically deformable plunger 602. The elastically deformable plunger 602 is conductive. The plunger 602 may be sphere-shaped or egg-shaped. The plunger 602 is connected at its proximal end to a SMA actuator 604A and at its distal end to a SMA actuator 604B. The SMA actuators 604A and 604B are fixedly connected to a substrate at their ends opposite the plunger 602. The SMA actuators 604A and 604B may be springs or wires constructed of a shape-memory material.

The SMAAS 600 also includes electrical contacts 606A, 606B, 606C, and 606D that are each fixed to the substrate on one of their ends. The electrical contacts 606A, 606B, 606C, and 606D are rigid. A distance between the electrical contacts 606A and 606B and between the electrical contacts 606C and 606D is shorter than a width of the plunger 602. Therefore, when the plunger 602 is positioned between the electrical contacts 606A and 606B or between the electrical contacts 606C and 606D, the plunger 602 deforms to fit within the electrical contacts 606A and 606B or the electrical contacts 606C and 606D.

The example SMAAS 600 may include positive power signal terminals 616A and 616B and negative power signal terminals 618A and 618B for connecting to two separate circuits, respectively. The example SMAAS 600 may include positive control signal terminals 612A and 612B and a negative control signal terminals 614A and 614B for supplying current to the SMA actuators 604A and 604B, respectively. The supplied control current actuates the SMA actuator 604A or 604B, causing the SMA actuator 604A or 604B to change shape (e.g., lengthen or shorten or otherwise deform), which controls whether a circuit is opened or closed. The example SMAAS 600 includes two states of operation FIG. 6A illustrates a neutral, manufactured position of the plunger 602 prior to the SMAAS 600 being actuated into one of its two possible states.

For instance, supplying current through the SMA actuator 604A via the positive control signal terminal 612A and the negative control signal terminal 614A may cause the SMA actuator 604A to shorten deform as illustrated by the dashed line in FIG. 6B. The deformed SMA actuator 604A translates the conductive plunger 602 between the electrical contacts 606A and 606B, as illustrated in FIG. 6B. The circuit attached at the positive power signal terminal 616A and the negative power signal terminal 618A is thereby closed. This may constitute a first state of the SMAAS 600.

Deformation of the plunger 602, illustrated by the dashed lines in FIG. 6B, produces a force that maintains strong contact between the electrical contacts 606A and 606B and the plunger 602. The restorative energy from the elastic deformation of the plunger 602 applies pressure to the electrical contacts 606A and 606B that maintains the plunger 602 in place. The produced force from the plunger 602 therefore provides a retention mechanism that maintains the SMAAS 600 in an actuated state. To overcome the force of the plunger 602, the SMA actuator 604B may be actuated.

Actuating the SMA actuator 604B translates the conductive plunger 602 between the electrical contacts 606C and 606D. The circuit attached at the positive power signal terminal 616B and the negative power signal terminal 618B is thereby closed. This may constitute a second state of the SMAAS 600. The plunger 602 may elastically deform to maintain the plunger 602 in this position, as described above, until the SMA actuator 604A is actuated.

In some examples, actuating the SMA actuators 604A and 604B may cause them to lengthen rather than shorten. In such examples, it will be appreciated that actuating the SMA actuator 604A or 604B will close the opposite circuit as described above.

Figure 7A:
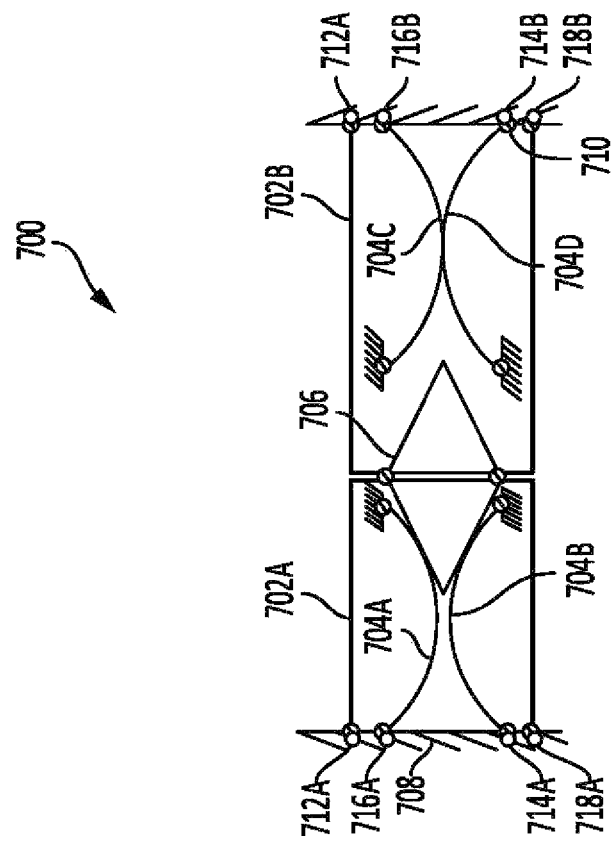
FIGS. 7A and 7B illustrate cross-sectional top view schematics of an example combined translational, deformational SMAAS configuration, according to an embodiment of the present disclosure.
Figure 7B:
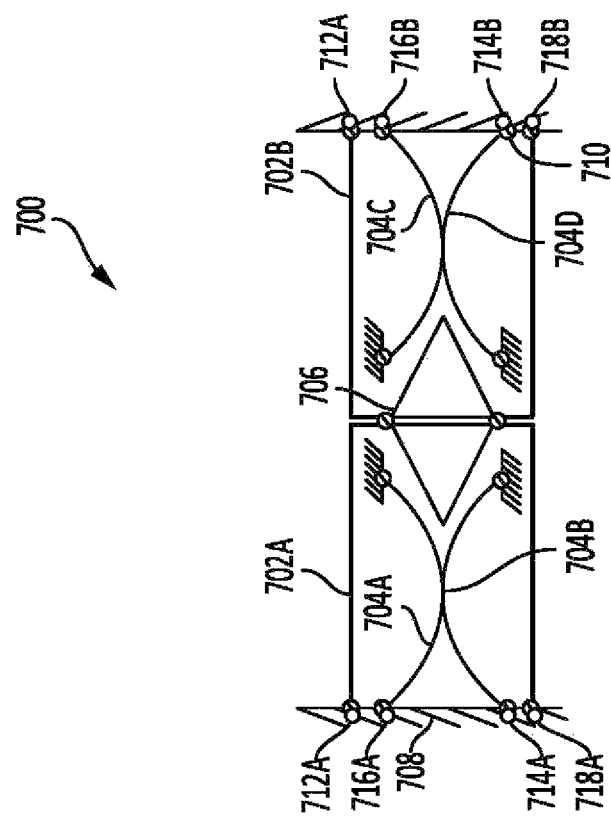

FIGS. 7A and 7B illustrate cross-sectional top view schematics of an example SMAAS 700. The SMAAS 700 is an example combined translational and deformational configuration of the present disclosure. The example SMAAS 700 includes a plunger 706 constructed of an insulating material. In some aspects, the plunger 706 is shaped to include opposing pointed ends, as illustrated in FIGS. 7A and 7B The plunger 706 is connected to SMA actuators 702A and 702B. For instance, the SMA actuators 702A and 702B may be routed through the plunger 706. Routing the SMA actuators 702A and 702B through the plunger 706 may help isolate the electrical connection to SMA actuators 702A and 702B from the motion of the plunger 706. The SMA actuators 702A and 702B may be springs or wires constructed of a shape-memory material. The respective ends of the SMA 702A and 702B opposite the plunger 706 are connected to a substrate.

The SMAAS 700 also includes electrical contacts 704A, 704B, 704C, and 704D. The respective ends of each electrical contact 704A, 704B, 704C, and 704D are fixed to the substrate. Initially, the electrical contacts 704A and 704B and the electrical contacts 704C and 704D are in a closed position such that they are in contact with one another so that an electrical connection may be had between the electrical contacts 704A and 704B and the electrical contacts 704C and 704D, as illustrated in FIG. 7A. The electrical contacts 704A, 704B, 704C, and 704D are elastically deformable.

The example SMAAS 700 may include positive power signal terminals 716A and 716B and negative power signal terminals 718A and 718B for connecting to two separate circuits, respectively. The example SMAAS 700 may include positive control signal terminals 712A and 712B and a negative control signal tell finals 714A and 714B for supplying current to the SMA actuators 702A and 702B, respectively. The supplied control current actuates the SMA actuator 702A or 702B, causing the SMA actuator 702A or 702B to change shape (e.g., lengthen or shorten or otherwise deform), which controls whether a circuit is opened or closed. The example SMAAS 700 includes two states of operation FIG. 7A illustrates a neutral, manufactured position of the plunger 702 prior to the SMAAS 700 being actuated into one of its two possible states.

For instance, the circuit attached at the positive power signal terminal 716A and the negative power signal terminal 718A is initially closed such that current may flow through the circuit. Supplying current through the SMA actuator 702A via the positive control signal terminal 712A and the negative control signal terminal 714A may cause the SMA actuator 702A to deform and translate the insulating plunger 706 between the electrical contacts 704A and 704B. The insulating plunger 706 forces the electrical contact 704A away from the electrical contact 704B. Since current cannot flow through the insulating plunger 706, the circuit attached at the positive power signal terminal 716A and the negative power signal terminal 718A is thereby opened. Meanwhile, the circuit attached at the positive power signal terminal 716B and the negative power signal terminal 718B remains closed. This may constitute a first state of the SMAAS 700.

In some instances, deformation of the electrical contacts 704A and 704B produces a force that maintains strong contact between the electrical contacts 704A and 704B and the plunger 706. The restorative energy from the elastic deformation of the electrical contacts 704A and 704B may apply pressure to the plunger 706 that maintains the plunger 706 in place. The produced force from the electrical contacts 704A and 704B may therefore provides a retention mechanism that maintains the SMAAS 700 in an actuated state. To overcome the force of the electrical contacts 704A and 704B, the SMA actuator 702B may be actuated.

Actuating the SMA actuator 702B translates the insulating plunger 706 between the electrical contacts 704C and 704D. The circuit attached at the positive power signal terminal 716B and the negative power signal terminal 718B is thereby opened. The electrical contacts 704A and 704B elastically return to contacting one another to close the circuit attached at the positive power signal terminal 716A and the negative power signal terminal 718A. This may constitute a second state of the SMAAS 700. The electrical contacts 704C and 704D may maintain the plunger 502 in this position in some instances, as described above, until the SMA actuator 702A is actuated.

In some examples, actuating the SMA actuators 702A and 702B may cause them to lengthen rather than shorten. In such examples, it will be appreciated that actuating the SMA actuator 702A or 702B will open the opposite circuit as described above.

Figure 8B:
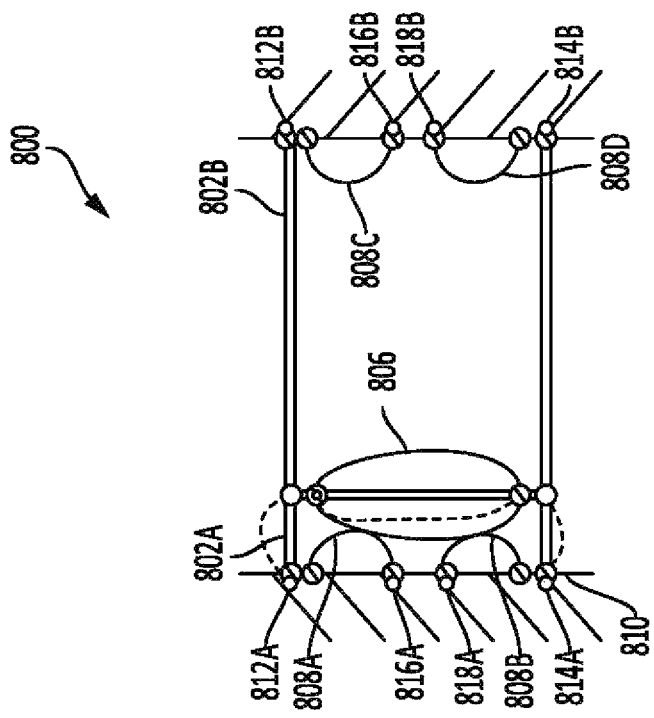
FIGS. 8A and 8B illustrate cross-sectional top view schematics of an example combined translational, deformational SMAAS configuration, according to an embodiment of the present disclosure.
Figure 8A:
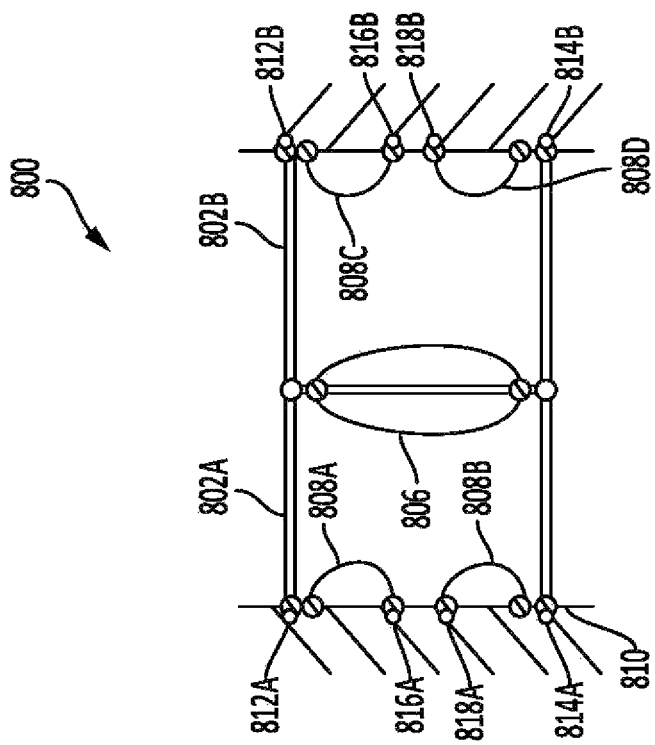

FIGS. 8A and 8B illustrate cross-sectional top view schematics of an example SMAAS 800. The SMAAS 800 is an example combined translational and deformational configuration of the present disclosure. The example SMAAS 800 includes a plunger 806 constructed of a conductive material. The plunger 806 is elastically deformable. The plunger 806 is connected to SMA actuators 802A and 802B. For instance, the SMA actuators 802A and 802B may be routed through the plunger 806. Routing the SMA actuators 802A and 802B through the plunger 806 may help isolate the electrical connection to SMA actuators 802A and 802B from the motion of the plunger 806. The SMA actuators 802A and 802B may be springs or wires constructed of a shape-memory material. The respective ends of the SMA 802A and 802B opposite the plunger 806 are connected to a substrate.

The SMAAS 800 also includes electrical contacts 808A, 808B, 808C, and 808D. The electrical contacts 804A, 804B, 804C, and 804D are fixed to the substrate. The electrical contacts 804A, 804B, 804C, and 804D are elastically deformable.

The example SMAAS 800 may include positive power signal terminals 816A and 816B and negative power signal terminals 818A and 818B for connecting to two separate circuits, respectively. The example SMAAS 800 may include positive control signal terminals 812A and 812B and a negative control signal terminals 814A and 814B for supplying current to the SMA actuators 802A and 802B, respectively. The supplied control current actuates the SMA actuator 802A or 802B, causing the SMA actuator 802A or 802B to change shape (e.g., lengthen or shorten or otherwise deform), which controls whether a circuit is opened or closed. The example SMAAS 800 includes two states of operation. FIG. 8A illustrates a neutral, manufactured position of the plunger 806 prior to the SMAAS 800 being actuated into one of its two possible states.

For instance, supplying current through the SMA actuator 802A via the positive control signal terminal 812A and the negative control signal terminal 814A may cause the SMA actuator 802A to shorten or deform as illustrated by the dashed line in FIG. 8B. The deformed SMA actuator 802A translates the conductive plunger 806 to the electrical contacts 808A and 808B, as illustrated in FIG. 8B. The circuit attached at the positive power signal terminal 816A and, the negative power signal terminal 818A is thereby closed. This may constitute a first state of the SMAAS 800.

Deformation of the plunger 806 and of the electrical contacts 808A and 808B, produces restorative force against each other, which maintains strong contact between the plunger 806 and the electrical contacts 808A and 808B. The opposing restorative forces therefore provide a retention mechanism that maintains the SMAAS 800 in an actuated state. To overcome the opposing restorative forces, the SMA actuator 802B may be actuated.

Actuating the SMA actuator 802B translates the conductive plunger 806 to the electrical contacts 808C and 808D. The circuit attached at the positive power signal terminal 816B and the negative power signal terminal 818B is thereby closed. This may constitute a second state of the SMAAS 800. Deformation of the plunger 806 and of the electrical contacts 808C and 808D may maintain the plunger 806 in this position, as described above, until the SMA actuator 802A is actuated.

In some examples, actuating the SMA actuators 802A and 802B may cause them to lengthen rather than shorten. In such examples, it will be appreciated that actuating the SMA actuator 802A or 802B will close the opposite circuit as described above.

FIGS. 9A and 9B illustrate cross-sectional top view schematics of an example SMAAS 900. The SMAAS 900 is an example translational and deformational configuration of the present disclosure. The example SMAAS 900 includes a conductive strip 904, such as a metal strip or leaf spring. The ends of the conductive strip 904 are fixed to a substrate 908. The conductive strip 904 is also connected to the SMA actuators 902A and 902B. The respective ends of the SMA actuators 902A and 902B opposite the conductive strip 904 are fixed to the substrate 908. The SMA actuators 902A and 902B may be springs or wires constructed of a shape-memory material. The SMAAS 900 also includes electrical contacts 906A, 906B, 906C, and 906D. The electrical contacts 906A, 906B, 906C, and 906D are fixed to the substrate 908.

The example SMAAS 900 may include positive power signal terminals 914A and 914B and negative power signal terminals 916A and 916B for connecting to two separate circuits, respectively. The example SMAAS 900 may include positive control signal terminals 910A and 910B and a negative control signal terminals 912A and 912B for supplying current to the SMA actuators 802A and 802B, respectively. The supplied control current actuates the SMA actuator 902A or 902B, causing the SMA actuator 902A or 902B to change shape (e.g., lengthen or shorten or otherwise deform), which controls whether a circuit is opened or closed. The example SMAAS 900 includes two states of operation.

For instance, supplying current through the SMA actuator 902B via the positive control signal terminal 910B and the negative control signal terminal 912B may cause the SMA actuator 902B to shorten or deform as illustrated by the dashed line in FIG. 9A. The deformed SMA actuator 902B translates the portion of the conductive strip 904 connected to the SMA actuator 902B towards the electrical contacts 906C and 906D. This translation causes the conductive strip 904 to deform and contact the electrical contacts 906C and 906D, as illustrated in FIG. 9A. The circuit attached at the positive power signal terminal 914B and the negative power signal terminal 916B is thereby closed. This may constitute a first state of the SMAAS 900.

Deformation of the conductive strip 904 produces a restorative force that maintains a strong connection between the conductive strip 904 and the electrical contacts 906C and 906D. The restorative force therefore provides a retention mechanism that maintains the SMAAS 900 in an actuated state. To overcome the opposing restorative forces, the SMA actuator 902A may be actuated. In addition, the restorative force of the conductive strip 904 may have a snap-action nature that helps assist in the speed and force of switching between states. The restorative force may also help provide protection against relaxation of the SMA actuator 902A after cooling.

Actuating the SMA actuator 902A translates the portion of the conductive strip 904 connected to the SMA actuator 902A towards the electrical contacts 906A and 906B. This translation causes the conductive strip 904 to deform and contact the electrical contacts 906A and 906B, as illustrated in FIG. 9B. The circuit attached at the positive power signal terminal 914A and the negative power signal terminal 916A is thereby closed. This may constitute a second state of the SMAAS 900. Deformation of the conductive strip 904 may maintain a strong connection between the conductive strip 904 and the electrical contacts 906A and 906B, as described above, until the SMA actuator 902B is actuated.

In some examples, actuating the SMA actuators 902A and 902B may cause them to lengthen rather than shorten. In such examples, it will be appreciated that actuating the SMA actuator 902A or 902B will close the opposite circuit as described above.

Figure 10A:
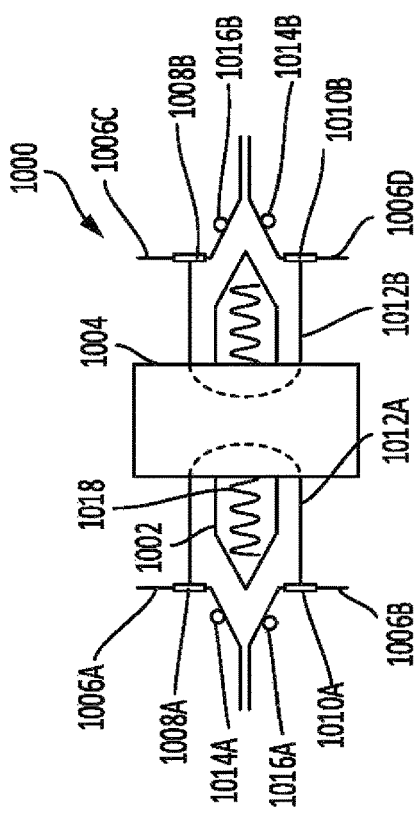
FIGS. 10A, 10B, and 10C illustrate cross-sectional top view schematics of an example combined translational, deformational SMAAS configuration, according to an embodiment of the present disclosure.
Figure 10C:
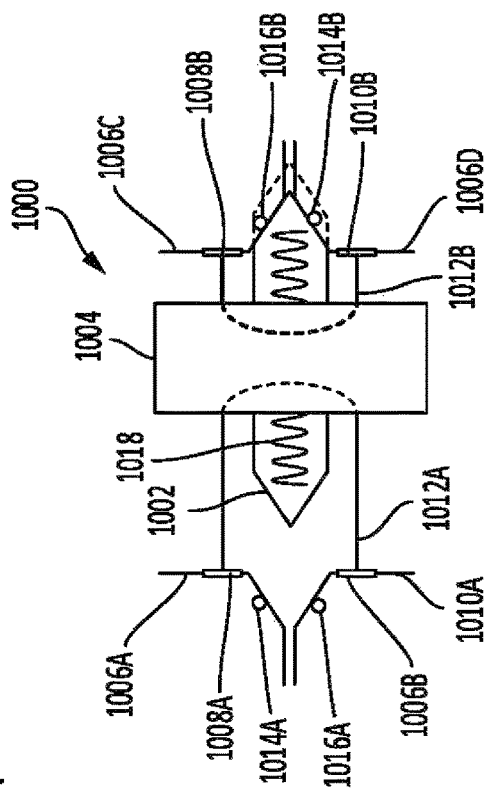
Figure 10B:
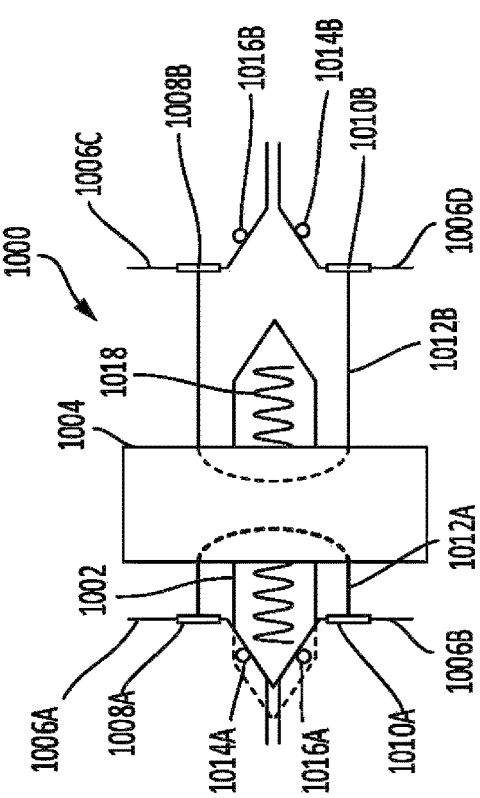

FIGS. 10A, 10B, and 10C illustrate cross-sectional top view schematics of an example SMAAS 1000. The SMAAS 1000 is an example translational and deformational configuration of the present disclosure. The SMAAS 1000 includes a conductive plunger 1002. The conductive plunger includes a spring 1018 such that the conductive plunger 1002 may be compressed. The plunger 1002 is connected to SMA actuators 1012A and 1012B. For instance, the SMA actuators 1012A and 1012B may be routed through the plunger 1002. Routing the SMA actuators 1012A and 1012B through the plunger 1002 may help isolate the electrical connection to SMA actuators 1012A and 1012B from the motion of the plunger 1002 as well as provide a larger available transformation strain at the expense of the energy required to actuate the SMA actuators 1012A and 1012B. The SMA actuators 1012A and 1012B may be springs or wires constructed of a shape-memory material. The SMAAS 1000 may include an insulating separator 1004 between the SMA actuators 1012A and 1012B. The SMAAS 1000 also includes electrical contacts 1006A, 1006B, 1006C, and 1006D. The electrical contacts 1006A, 1006B, 1006C, and 1006D are fixed to the substrate.

The example SMAAS 1000 may include positive power signal terminals 1014A and 1014B and negative power signal terminals 1016A and 1016B for connecting to two separate circuits, respectively. The example SMAAS 1000 may include positive control signal terminals 1008A and 1008B and a negative control signal terminals 1010A and 1010B for supplying current to the SMA actuators 1012A and 1012B, respectively. The supplied control current actuates the SMA actuator 1012A or 1012B, causing the SMA actuator 1012A or 1012B to change shape (e.g., lengthen or shorten or otherwise deform), which controls whether a circuit is opened or closed. The example SMAAS 1000 includes two states of operation. FIG. 10A illustrates a neutral, manufactured position of the plunger 1002 prior to the SMAAS 1000 being actuated into one of its two possible states.

For instance, supplying current through the SMA actuator 1012A via the positive control signal terminal 1008A and the negative control signal terminal 1010A may cause the SMA actuator 1012A to shorten or deform as illustrated in FIG.

10B. The deformed SMA actuator 1012A translates the conductive plunger 1002 to the electrical contacts 1006A and 1006B, as illustrated in FIG. 10B. The circuit attached at the positive power signal terminal 1014A and the negative power signal terminal 1016A is thereby closed. This may constitute a first state of the SMAAS 1000.

Translating the conductive plunger 1002 to the electrical contacts 1006A and 1006B causes the conductive plunger 1002 to compress (e.g., as compared to the dashed lines in FIG. 10B) due to the spring 1018 of the conductive plunger 1002. Deformation of the compressive spring 1018 produces an opposing force that maintains strong contact between the conductive plunger 1002 and the electrical contacts 1006A and 1006B, and therefore provides a retention mechanism that maintains the SMAAS 1000 in an actuated state. To overcome the opposing spring force, the SMA actuator 1012B may be actuated.

Actuating the SMA actuator 1012B translates the conductive plunger 1002 to the electrical contacts 1006C and 1006D, as illustrated in FIG. 10C. The circuit attached at the positive power signal terminal 1008B and the negative power signal terminal 1008B is thereby closed. This may constitute a second state of the SMAAS 1000. Compression of the spring 1018 of the plunger 1002 may maintain the plunger 1002 in this position, as described above, until the SMA actuator 1012A is actuated.

In some examples, actuating the SMA actuators 1012A and 1012B may cause them to lengthen rather than shorten. In such examples, it will be appreciated that actuating the SMA actuator 1012A or 1012B will close the opposite circuit as described above.

Figure 11:
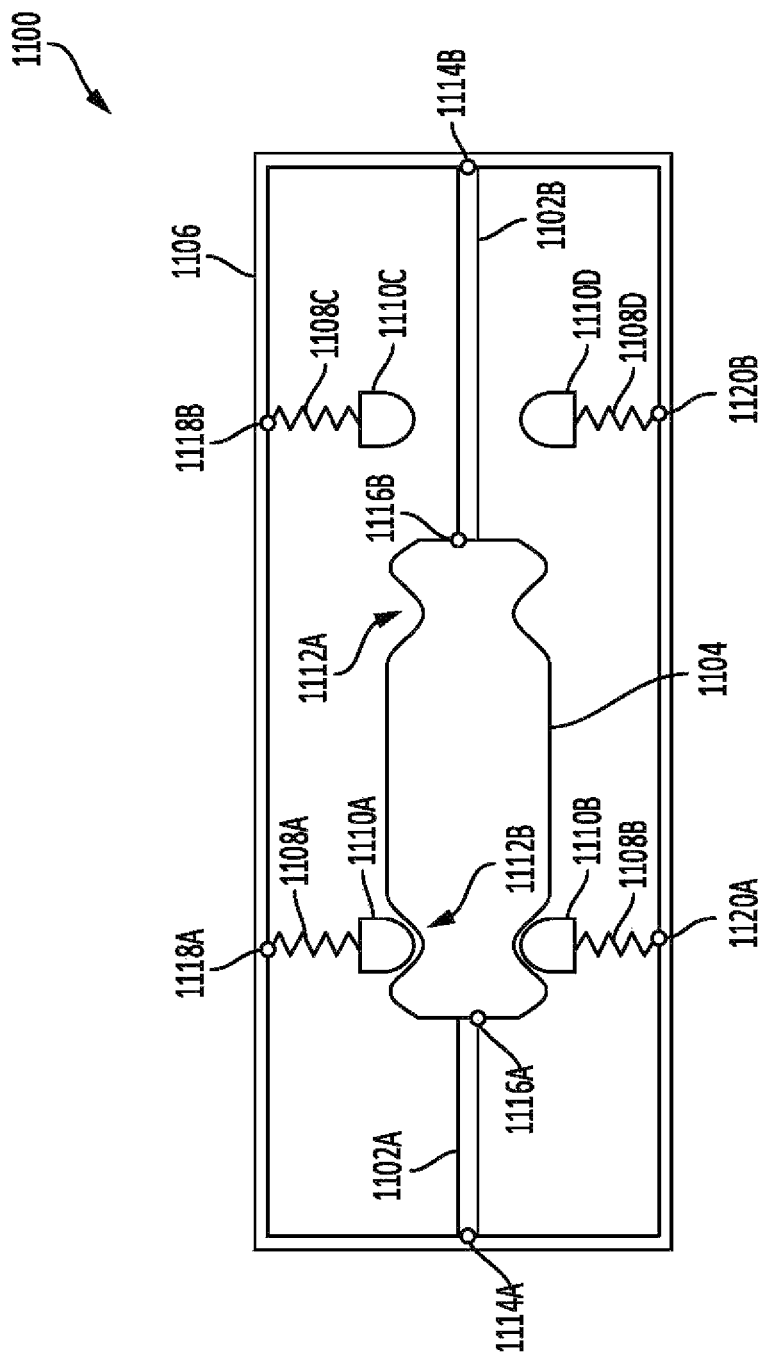
FIG. 11 illustrates a cross-sectional top view schematic of an example combined translational, deformational SMAAS configuration having a retention mechanism including spring-loaded contacts and a grooved conductive plunger, according to an embodiment of the present disclosure.

FIG. 11 illustrates a cross-sectional top view schematic of an example SMAAS 1100. The SMAAS 1100 is an example combined translational and deformational configuration of the present disclosure. The SMAAS 1100 includes a conductive plunger 1104. The conductive plunger includes multiple notches 1112A and 1112B. As FIG. 11 is a cross-section, it should be appreciated that the respective notches 1112A and 1112B may extend around the perimeter of the conductive plunger 1104. A proximal end of the conductive plunger 1104 is connected to a SMA actuator 1102A. A distal end of the conductive plunger 1104 is connected to a SMA actuator 1102B. The enclosure 1106 encloses the components of the SMAAS 1100 from the external environment.

The SMAAS 1100 also includes electrical contacts 1110A, 1110B, 1110C, and 1110D. The electrical contacts 1110A, 1110B, 1110C, and 1110D are connected to respective springs 1108A, 1108B, 1108C, and 1108D. A distance between the electrical contacts 1110A and 1110B and between the electrical contacts 1110C and 1110D is shorter than a widest width of the conductive plunger 1104 (e.g., portions other than its notches 1112A and 1112B).

The example SMAAS 1100 may include positive power signal terminals 1118A and 1118B and negative power signal terminals 1120A and 1120B for connecting to two separate circuits, respectively. The example SMAAS 1100 may include positive control signal terminals 1114A and 1114B and a negative control signal terminals 1116A and 1116B for supplying current to the SMA actuators 1102A and 1102B, respectively. The supplied control current actuates the SMA actuator 1102A or 1102B, causing the SMA actuator 1102A or 1102B to change shape (e.g., lengthen or shorten or otherwise deform), which controls whether a circuit is opened or closed. The example SMAAS 1100 includes two states of operation.

For instance, supplying current through the SMA actuator 1102A via the positive control signal terminal 1114A and the negative control signal terminal 1116A may cause the SMA actuator 1102A to shorten or deform as illustrated in FIG. 11. The deformed SMA actuator 1102A translates the conductive plunger 1104 such that the electrical contacts 1110A and 1110B are positioned within the notch 1112B, as illustrated in FIG. 11. As the conductive plunger 1104 is translated between the electrical contacts 1110A and 1110B, the respective springs 1108A and 1108B compress to accommodate the wider portion of the conductive plunger 1104, and then release as the electrical contacts 1110A and 1110B position themselves within the notch 1112B. The circuit attached at the positive power signal terminal 1118A and the negative power signal terminal 1118A is thereby closed. This may constitute a first state of the SMAAS 1100.

The spring-loaded electrical contacts 1110A and 1110B provide a retention mechanism when positioned within the notch 1112B that maintains SMAAS 1100 in an actuated state. To overcome the opposing spring force, the SMA actuator 1102B may be actuated.

Actuating the SMA actuator 1102B translates the conductive plunger 1104 such that the electrical contacts 11100 and 1110D are positioned within the notch 1112A. The circuit attached at the positive power signal terminal 1118B and the negative power signal terminal 1120B is thereby closed. This may constitute a second state of the SMAAS 1100. The spring-loaded electrical contacts 1110C and 1110D may maintain the plunger 1104 in this position, as described above, until the SMA actuator 1102A is actuated.

In some examples, actuating the SMA actuators 1102A and 1102B may cause them to lengthen rather than shorten. In such examples, it will be appreciated that actuating the SMA actuator 1102A or 1102B will close the opposite circuit as described above.

Figure 12:
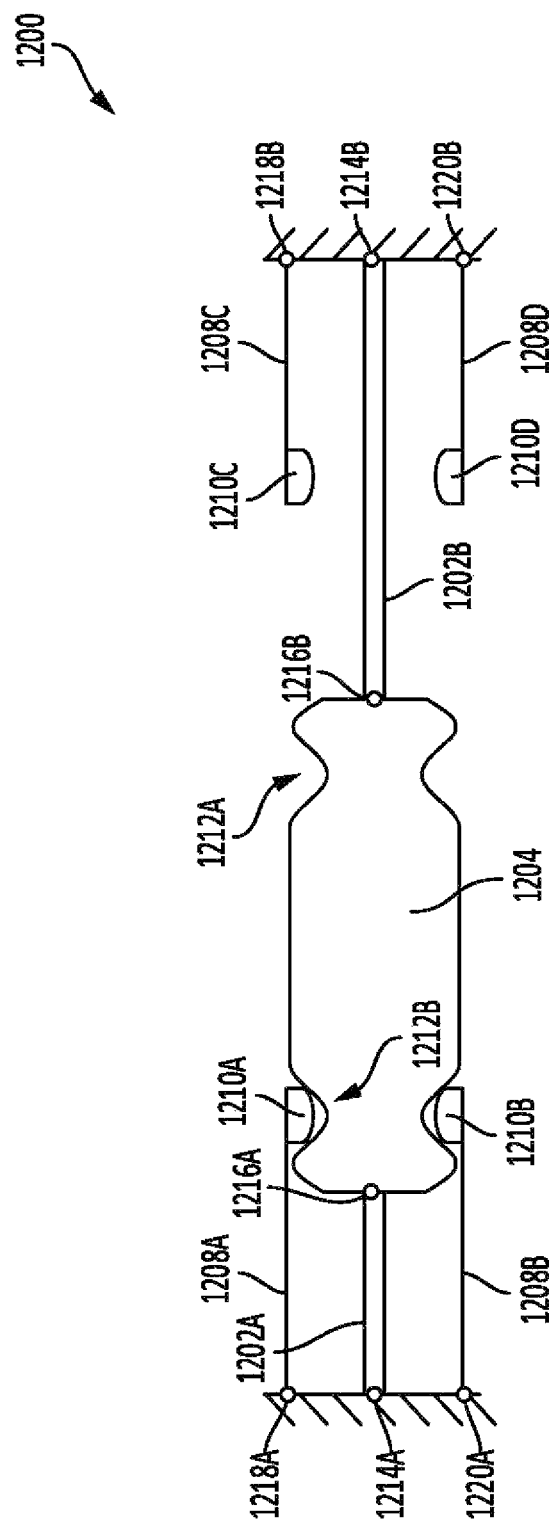
FIG. 12 illustrates a cross-sectional top view schematic of an example combined translational, deformational SMAAS configuration having a retention mechanism including leaf springs and a grooved conductive plunger, according to an embodiment of the present disclosure.

FIG. 12 illustrates a cross-sectional top view schematic of an example SMAAS 1200. The SMAAS 1200 is an example combined translational and deformational configuration of the present disclosure. The SMAAS 1200 is similar to the example SMAAS 1100 except that the SMAAS 1200 includes leaf spring electrical contacts rather than spring-loaded electrical contacts. The SMAAS 1200 includes a conductive plunger 1204. The conductive plunger includes multiple notches 1212A and 1212B. As FIG. 12 is a cross-section, it should be appreciated that the respective notches 1212A and 1212B may extend around the perimeter of the conductive plunger 1204. A proximal end of the conductive plunger 1204 is connected to a SMA actuator 1202A. A distal end of the conductive plunger 1204 is connected to a SMA actuator 1202B.

The SMAAS 1200 also includes electrical contacts 1210A, 1210B, 1210C, and 1210D. The electrical contacts 1210A, 1210B, 1210C, and 1210D are connected to respective leaf springs 1208A, 1208B, 1208C, and 1208D. In some instances the respective electrical contacts 1210A, 1210B, 1210C, and 1210D and the respective leaf springs 1208A, 1208B, 1208C, and 1208D may be a single component rather than being connected. A distance between the electrical contacts 1210A and 1210B and between the electrical contacts 1210C and 1210D is shorter than a widest width of the conductive plunger 1204 (e.g., portions other than its notches 1212A and 1212B).

The example SMAAS 1200 may include positive power signal terminals 1218A and 1218B and negative power signal terminals 1220A and 1220B for connecting to two separate circuits, respectively. The example SMAAS 1200 may include positive control signal terminals 1214A and 1214B and a negative control signal terminals 1216A and 1216B for supplying current to the SMA actuators 1202A and 1202B, respectively. The supplied control current actuates the SMA actuator 1202A or 1202B, causing the SMA actuator 1202A or 1202B to change shape (e.g., lengthen or shorten or otherwise deform), which controls whether a circuit is opened or closed. The example SMAAS 1200 includes two states of operation.

For instance, supplying current through the SMA actuator 1202A via the positive control signal terminal 1214A and the negative control signal terminal 1216A may cause the SMA actuator 1202A to shorten or deform as illustrated in FIG. 12. The deformed SMA actuator 1202A translates the conductive plunger 1204 such that the electrical contacts 1210A and 1210B are positioned within the notch 1212B, as illustrated in FIG. 12. As the conductive plunger 1204 is translated between the electrical contacts 1210A and 1210B, the respective leaf springs 1208A and 1208B flex to increase a distance between the electrical contacts 1210A and 1210B and accommodate the wider portion of the conductive plunger 1204. The respective leaf springs 1208A and 1208B then elastically release to their resting state as the electrical contacts 1210A and 1210B position themselves within the notch 1212B. The circuit attached at the positive power signal terminal 1218A and the negative power signal terminal 1218A is thereby closed. This may constitute a first state of the SMAAS 1200.

The leaf springs 1208A and 1208B and their respective electrical contacts 1210A and 1210B provide a retention mechanism when the electrical contacts 1210A and 1210B are positioned within the notch 1212B, which maintains SMAAS 1200 in an actuated state. To overcome the opposing leaf spring force that maintains the electrical contacts 1210A and 1210B within the notch 1212B, the SMA actuator 1202B may be actuated.

Actuating the SMA actuator 1202B translates the conductive plunger 1204 such that the electrical contacts 1210C and 1210D are positioned within the notch 1212A. The circuit attached at the positive power signal terminal 1218B and the negative power signal terminal 1220B is thereby closed. This may constitute a second state of the SMAAS 1200. The leaf springs 1208A, 1208B and their respective electrical contacts 1110C, 1110D may maintain the plunger 1204 in this position, as described above, until the SMA actuator 1202A is actuated.

In some examples, actuating the SMA actuators 1202A and 1202B may cause them to lengthen rather than shorten. In such examples, it will be appreciated that actuating the SMA actuator 1202A or 1202B will close the opposite circuit as described above.

Figure 13A:
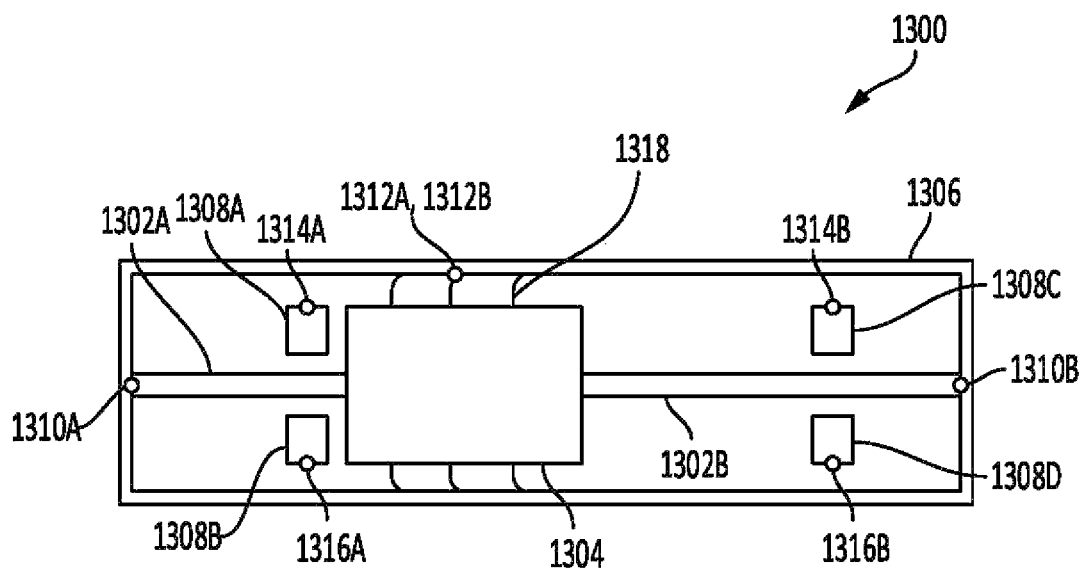
FIG. 13A illustrates a cross-sectional top view schematic of an example combined translational, deformational SMAAS configuration having a retention mechanism including wipers, according to an embodiment of the present disclosure.

FIG. 13A illustrates a cross-sectional top view of an example SMAAS 1300. The SMAAS 1300 is an example combined translational and deformational configuration of the present disclosure. The example SMAAS 1300 includes a conductive plunger 1304. The conductive plunger 1304 is connected to multiple sliding contacts 1318. Only one sliding contact 1318 is indicted in FIG. 13A for simplicity. The enclosure 1306 encloses the components of the SMAAS 1300 from the external environment. A proximal end of the conductive plunger 1304 is connected to a SMA actuator 1302A. A distal end of the conductive plunger 1304 is connected to a SMA actuator 1302B. The SMAAS 1300 also includes electrical contacts 1308A, 1308B, 1308C, and 1308D.

Figure 13B:
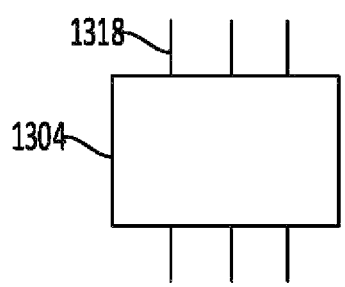
FIGS. 13B and 13C illustrate cross-sectional top view schematics of configurations of the conductive plunger and wipers of the example SMAAS illustrated in FIG. 13A.
Figure 13C:
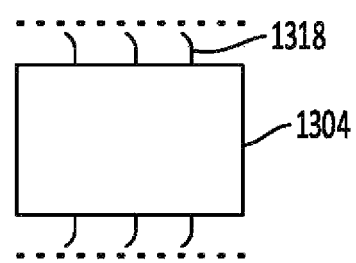

The sliding contacts 1318 provide the dual functionality of providing resistance to the relaxation force of the SMA actuators 1302A, 1302B as well as acting as a grounding terminal for the heating circuits of the SMA actuators 1302A, 1302B. Stated differently, sliding contacts 1318 of the SMAAS 1300 provides for grounding the conductive plunger 1304 as well as provide a strong friction/locking force that overcomes springback. The sliding contacts 1318 are manufactured in an upright position (e.g., FIG. 13B) The sliding contacts 1318 may curve in response to an actuated SMA actuator 1302A or 1302B translating the conductive plunger 1304 (e.g., FIGS. 13A and 13B). Moving the conductive plunger 1304 in the opposite direction requires the sliding contacts 1318 to change their curvature direction, which requires a large amount of force that springbuck cannot provide but the opposing SMA actuator 1302A or 1302B can. The sliding contacts 1318 therefore provide a retention mechanism.

The example SMAAS 1300 may include positive power signal terminals 1314A and 1314B and negative power signal terminals 1312A and 1312B for connecting to two separate circuits, respectively. The example SMAAS 1300 may include positive control signal terminals 1310A and 1310B and a negative control signal terminals 1316A and 1316B for supplying current to the SMA actuators 1302A and 1302B, respectively. The supplied control current actuates the SMA actuator 1302A or 1302B, causing the SMA actuator 1302A or 1302B to change shape (e.g., lengthen or shorten or otherwise deform), which controls whether a circuit is opened or closed. The example SMAAS 1300 includes two states of operation.

For instance, supplying current through the SMA actuator 1302A via the positive control signal terminal 1310A and the negative control signal terminal 1312A may cause the SMA actuator 1302A to shorten or deform as illustrated in FIG. 13A. The deformed SMA actuator 1302A translates the conductive plunger 1304 such that the conductive plunger 1304 contacts the electrical contacts 1308A and 1308B. The circuit attached at the positive power signal terminal 1314A and the negative power signal terminal 1316A is thereby closed. This may constitute a first state of the SMAAS 1300.

Actuating the SMA actuator 1302B translates the conductive plunger 1304 such that the conductive plunger 1304 contacts the electrical contacts 1308C and 1308D. The circuit attached at the positive power signal terminal 1314B and the negative power signal terminal 1316B is thereby closed. This may constitute a second state of the SMAAS 1300. The sliding contacts 1318 may maintain the conductive plunger 1304 in contact with the electrical contacts 1308A and 1308B or the electrical contacts 1308C and 1308D until the opposing SMA actuator 1302B or 1302A, respectively, is actuated, as described above.

In some examples, actuating the SMA actuators 1302A and 1302B may cause them to lengthen rather than shorten. In such examples, it will be appreciated that actuating the SMA actuator 1302A or 1302B will close the opposite circuit as described above.

Figure 14:
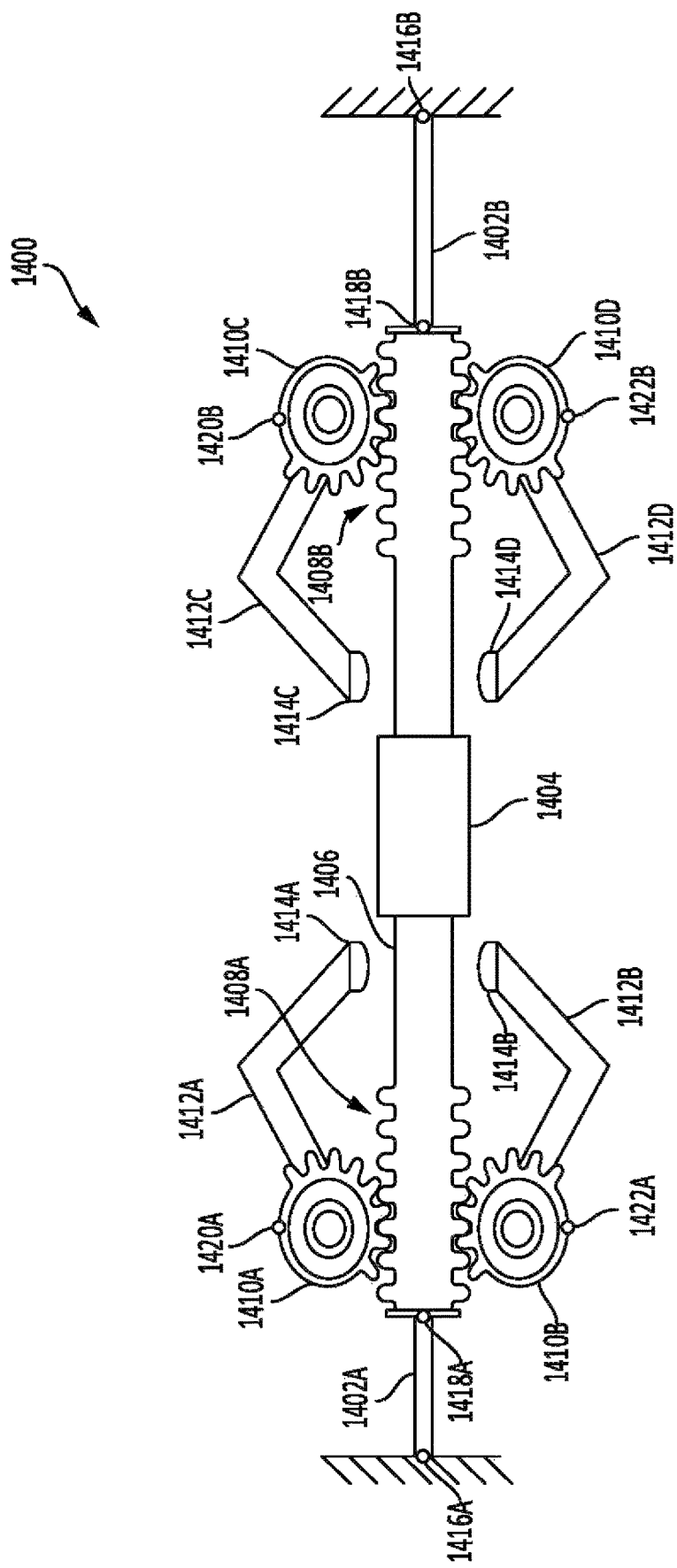
FIG. 14 illustrates a cross-sectional top view schematic of an example combined translational, rotational SMAAS configuration having a geared retention mechansim, according to an embodiment of the present disclosure.

FIG. 14 illustrates a cross-sectional top view schematic of an example SMAAS 1400. The SMAAS 1400 is an example translational and rotational configuration of the present disclosure. The example SMAAS 1400 includes a conductive plunger 1404. The conductive plunger 1404 may be attached to a rod 1406. The rod 1406 may be constructed of an insulating material. The rod 1406 includes threads 1408A and 1408B on its opposing sides. The threads 1408A are engaged with the pinions 1410A and 1410B, and the threads 1408B are engaged with the pinions 1410C and 1410D. The pinions 1410A, 1410B, 1410C, 1410D are each connected to an arm 1412A, 1412B, 1412C, 1412D. In an example, each arm 1412A, 1412B, 1412C, 1412D may be a leaf spring. An electrical contact 1414A, 1414B, 1414C, 1414D is included at the end of each of the arms 1412A, 1412B, 1412C, 1412D. The rod 1406 is connected to a SMA actuator 1402A and to a SMA actuator 1402B. In other examples, the rod 1406 may be two separate, threaded rods attached to each end of the conductive plunger 1404.

The example SMAAS 1400 may include positive power signal terminals 1420A and 1420B and negative power signal terminals 1422A and 1422B for connecting to two separate circuits, respectively. The example SMAAS 1400 may include positive control signal terminals 1416A and 1416B and a negative control signal terminals 1418A and 1418B for supplying current to the SMA actuators 1402A and 1402B, respectively. The supplied control current actuates the SMA actuator 1402A or 1402B, causing the SMA actuator 1402A or 1402B to change shape (e.g., lengthen or shorten or otherwise deform), which controls whether a circuit is opened or closed. The example SMAAS 1400 includes two states of operation.

For instance, supplying current through the SMA actuator 1402A via the positive control signal terminal 1416A and the negative control signal terminal 1418A may cause the SMA actuator 1402A to shorten or deform. The deformed SMA actuator 1402A advances the threaded engagement of the rod 1406 and the pinions 1410A and 1410B such that the conductive plunger 1404 is translated to contact the electrical contacts 1414A and 1414B. The circuit attached at the positive power signal terminal 1420A and the negative power signal terminal 1422A is thereby closed. This may constitute a first state of the SMAAS 1400.

As the pinions 1410A and 1410B are rotated via threaded engagement, the electrical contacts 1414A and 1414B move closer towards one another as the conductive plunger 1404 is positioned between the electrical contacts 1414A and 1414B. The electrical contacts therefore provide a locking or gripping force on the conductive plunger 1404, which acts as a retention mechanism. For the conductive plunger 1404 to break contact with the electrical contacts 1414A and 1414B, an opposing force has to be large enough to advance threaded engagement in the opposing direction against weight and friction. Such required opposing force may be large enough that typically it is not achieved except by actuating the SMA actuator 1402B. The pinions 1410A, 1410B, 1410C, 1410D provide a dual functionality as a retention mechanism and as a terminal for a load circuit. In addition, the threads 1408A on the rod 1406 and the threads on the pinions 1410A, 1410B, 1410C, 1410D control the exact actuation stroke length. The SMA actuators 1402A, 1402B therefore do not have to fully recover the strain, which protects against lifecycle degradation and irregular heating.

Actuating the SMA actuator 1402B advances the threaded engagement of the rod 1406 and the pinions 1410C and 1410D such that the conductive plunger 1404 is translated to contact the electrical contacts 1414C and 1414D. The circuit attached at the positive power signal terminal 1420B and the negative power signal terminal 1422B is thereby closed. This may constitute a second state of the SMAAS 1400. The threaded engagement of the rod 1406 and the pinions 1410C and 1410D may maintain the plunger 1404 in this position, as described above, until the SMA actuator 1402A is actuated.

In some examples, actuating the SMA actuators 1402A and 1402B may cause them to lengthen rather than shorten. In such examples, it will be appreciated that actuating the SMA actuator 1402A or 1402B will close the opposite circuit as described above.

Figure 15:
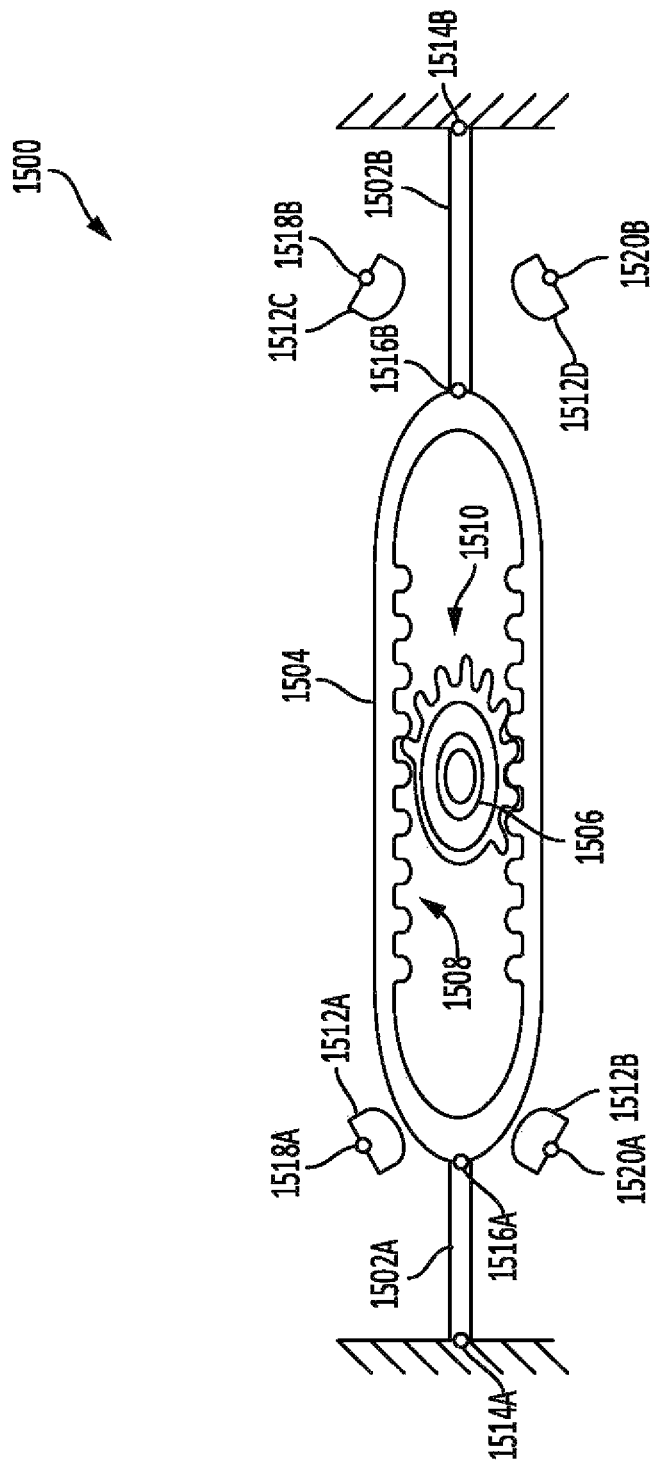
FIG. 15 illustrates a cross-sectional top view schematic of an example combined translational, rotational SMAAS configuration having a geared retention mechanism, according to an embodiment of the present disclosure.

FIG. 15 illustrates a cross-sectional top view schematic of an example SMAAS 1500. The SMAAS 1500 is an example translational and rotational configuration of the present disclosure. The example SMAAS 1500 includes a conductive plunger 1504. The conductive plunger 1504 includes threads 1508. The threads 1508 are engaged with the threads 1510 of a pinion 1506. Opposing ends of the conductive plunger 1504 are attached to the SMA actuators 1502A and 1502B. The SMAAS 1500 also includes the electrical contacts 1512A, 1512B, 1512C, 1512D.

The example SMAAS 1500 may include positive power signal terminals 1518A and 1518B and negative power signal terminals 1520A and 1520B for connecting to two separate circuits, respectively. The example SMAAS 1500 may include positive control signal terminals 1514A and 1514B and a negative control signal terminals 1516A and 1516B for supplying current to the SMA actuators 1502A and 1502B, respectively. The supplied control current actuates the SMA actuator 1502A or 1502B, causing the SMA actuator 1502A or 1502B to change shape (e.g., lengthen or shorten or otherwise deform), which controls whether a circuit is opened or closed. The example SMAAS 1500 includes two states of operation.

For instance, supplying current through the SMA actuator 1502A via the positive control signal terminal 1514A and the negative control signal terminal 1516A may cause the SMA actuator 1502A to shorten or deform. The deformed SMA actuator 1502A advances the threaded engagement of the conductive plunger 1504 and the pinion 1506 such that the conductive plunger 1504 is translated to contact the electrical contacts 1512A and 1512B. The circuit attached at the positive power signal terminal 1518A and the negative power signal terminal 1520A is thereby closed. This may constitute a first state of the SMAAS 1500.

When the SMAAS 1500 is in the first state, for the conductive plunger 1504 to break contact with the electrical contacts 1518A and 1520A, an opposing force has to be large enough to advance threaded engagement in the opposing direction against weight and friction. Such required opposing force may be large enough that typically it is not acheived except by actuating the SMA actuator 1502B. The threaded engagement of the conductive plunger 1504 and the pinion 1506 therefore provide a retention mechanism. In addition, the threads 1508 on the rod conductive plunger 1504 and the threads 1508 on the pinion 1506 control the exact actuation stroke length. The SMA actuators 1502A, 1502B therefore do not have to fully recover the strain, which protects against lifecycle degradation and irregular heating.

Actuating the SMA actuator 1502B advances the threaded engagement of the conductive plunger 1504 and the pinion 1506 such that the conductive plunger 1504 is translated to contact the electrical contacts 1512C and 1512D. The circuit attached at the positive power signal terminal 1518B and the negative power signal terminal 1520B is thereby closed. This may constitute a second state of the SMAAS 1500. The threaded engagement of the conductive plunger 1504 and the pinion 1506 may maintain the plunger 1504 in this position, as described above, until the SMA actuator 1502A is actuated.

In some examples, actuating the SMA actuators 1502A and 1502E may cause them to lengthen rather than shorten. In such examples, it will be appreciated that actuating the SMA actuator 1502A or 1502B will close the opposite circuit as described above.

Figure 16:
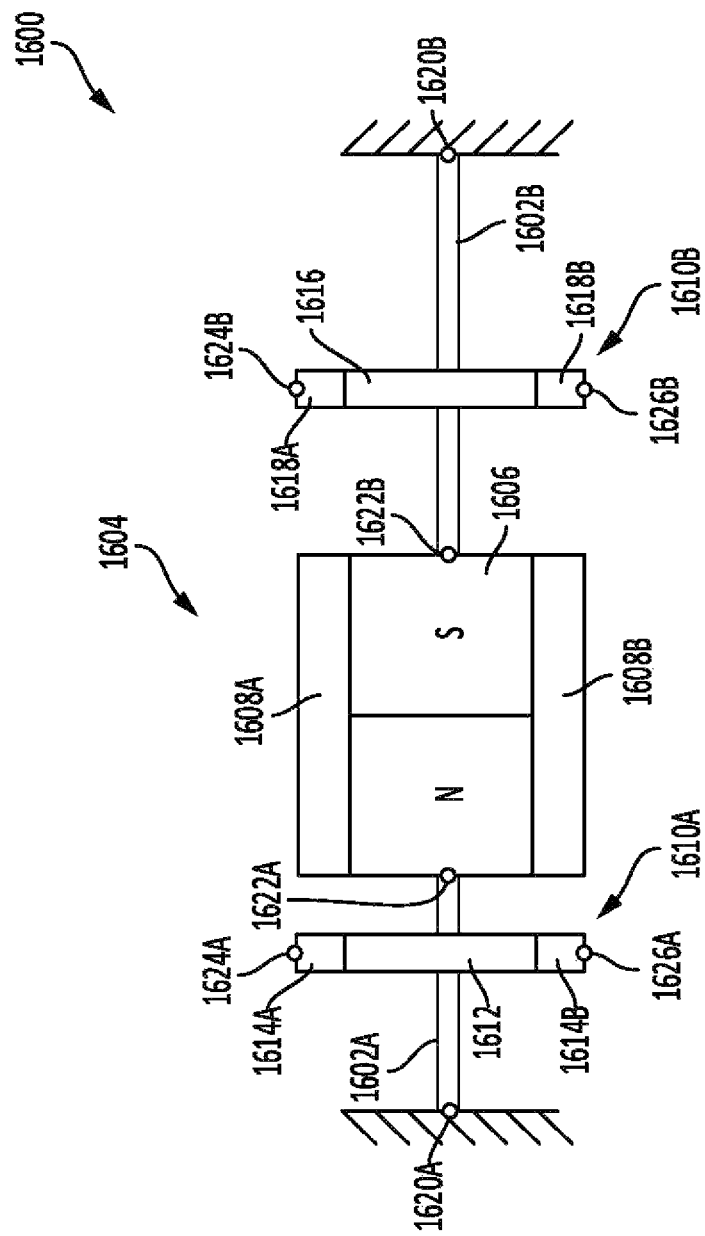
FIG. 16 illustrates a cross-sectional top view schematic of an example combined translational SMAAS configuration having a magnetic retention mechanism, according to an embodiment of the present disclosure.

FIG. 16 illustrates a cross-sectional top view schematic of an example SMAAS 1600. The SMAAS 1600 is an example translational configuration of the present disclosure. The SMAAS 1600 includes a plunger 1604. The plunger 1604 includes a magnet 1606 having two portions of opposite polarity as illustrated. The magnet 1606 may be constructed of hard magnetic material. The plunger 1604 also includes conductive substrates 1608A, 1608B attached to the magnet 1606. The plunger 1604 is attached on opposing sides to SMA actuators 1602A, 1602B.

The example SMAAS 1600 also includes the fixed contacts 1610A and 1610B. A position of the fixed contacts 1610A and 1610B is fixed relative to the plunger 1604. Each fixed contact 1610A, 1610B includes a magnet 1612, 1616 and electrical contacts 1614A, 1614B, 1614C, 1614D. The magnets 1612 and 1616 may be constructed of a soft magnetic material. In some examples, the magnets 1612, 1616 may be attached to and between the electrical contacts 1614A, 1614B, 1614C, 1614D, with insulating material between the respective magnets 1612, 1616 and the electrical contacts 1614A, 1614B, 1614C, 1614D. For instance, the electrical contacts 1614A and 1614B may be attached to the magnet 1612 as illustrated, with insulating material in between. In other examples, the electrical contacts 1614A, 1614B and the magnet 1612 may be separate components. The magnets 1612 and 1616 are the opposite polarity of the most adjacent portion of the magnet 1606. For example, the magnet 1612 may be a south polarity since the portion of the magnet 1606 most adjacent to the magnet 1612 is a north polarity. Likewise, the magnet 1616 may be a north polarity since the portion of the magnet 1606 most adjacent to the magnet 1616 is a south polarity.

The example SMAAS 1600 may include positive power signal terminals 1624A and 1624B and negative power signal terminals 1626A and 1626B for connecting to two separate circuits, respectively. The example SMAAS 1600 may include positive control signal terminals 1620A and 1620B and a negative control signal terminals 1622A and 1622B for supplying current to the SMA actuators 1602A and 1602B, respectively. The supplied control current actuates the SMA actuator 1602A or 1602B, causing the SMA actuator 1602A or 1602B to change shape (e.g., lengthen or shorten or otherwise deform), which controls whether a circuit is opened or closed. The example SMAAS 1600 includes two states of operation.

For instance, supplying current through the SMA actuator 1602A via the positive control signal terminal 1620A and the negative control signal terminal 1622A may cause the SMA actuator 1602A to shorten or deform. The deformed SMA actuator 1602A translates the plunger 1604 to contact the fixed contact 1610A such that the conductive substrate 1608A contacts the electrical contact 1614A, the magnet 1606 contacts the magnet 1612, and the conductive substrate 1608B contacts the electrical contact 1614B. The circuit attached at the positive power signal terminal 1624A and the negative power signal terminal 1626A is thereby closed. This may constitute a first state of the SMAAS 1600.

When the SMAAS 1600 is in the first state, for the plunger 1604 to break contact with the electrical contacts 1614A and 1614B, the opposing force has to be large enough to overcome the magnetic joining force between the magnet 1612 and the magnet 1606. Such magnetic force may be large enough that typically it is not overcome except by actuating the SMA actuator 1602B. The magnets 1606 and 1612 therefore provide a retention mechanism.

Actuating the SMA actuator 1602B translates the plunger 1604 to contact the fixed contact 1610B such that the conductive substrate 1608A contacts the electrical contact 1618A, the magnet 1606 contacts the magnet 1616, and the conductive substrate 1608B contacts the electrical contact 1618B. The circuit attached at the positive power signal terminal 1624B and the negative power signal terminal 1626B is thereby closed. This may constitute a second state of the SMAAS 1600. The magnetic joining force of the magnet 1606 and the magnet 1616 may maintain the plunger 1604 in this position, as described above, until the SMA actuator 1602A is actuated.

In some examples, actuating the SMA actuators 1602A and 1602B may cause them to lengthen rather than shorten. In such examples, it will be appreciated that actuating the SMA actuator 1602A or 1602B will close the opposite circuit as described above.

Figure 17:
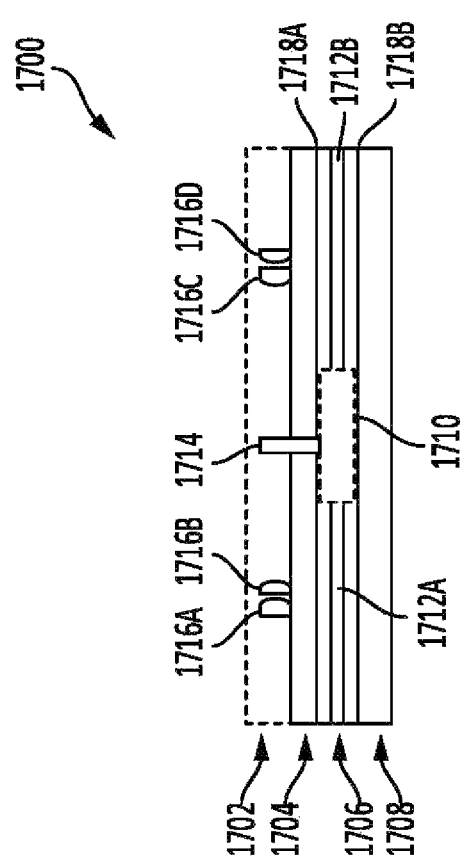
FIG. 17 illustrates a cross-sectional side view schematic of an example translational SMAAS configuration, according, to an embodiment of the present disclosure.

FIG. 17 illustrates a cross-sectional side view schematic of an example SMAAS 1700. The SMAAS 1700 in various instances may include four layers A first layer 1708 may include a substrate. A second layer 1706 may include guide rails 1718A, 1718B that guide a plunger 1710 attached to SMA actuators 1712A and 1712B. In some examples, the guide rails 1718A, 1718B may be vertically configured as illustrated in FIG. 17. In other examples, the guide rails 1718A, 1718B may be horizontally configured. A third layer 1704 may include a printed circuit board. A fourth layer 1702 may include an enclosure that encloses the components on the printed circuit board from the external environment. The SMAAS 1700 may include electrical contacts 1716A, 1716B, 1716C, 1716D on the printed circuit board. The electrical contacts 1716A, 1716B, 1716C, 1716D may be connected to load circuits. In various instances, the plunger 1710 may include a conductive arm 1714. The SMA actuators 1712A, 1712B may be actuated to translate the plunger 1710 so that the conductive arm 1714 contacts the electrical contacts 1716A and 1716B or the electrical contacts 1716C and 1716D in order to close a load circuit.

It should be appreciated that any of the preceding example SMAAS configurations disclosed herein may include the four layer configuration of the example SMAAS 1700. In some instances, one or more of the four layers may be combined. For example, the plunger 1710 may be conductive itself as described in the examples herein rather than include a separate conductive arm 1714. In such examples, the guide rails 1718A, 1718A, the plunger 1710, and the SMA actuators 1712A, 1712B may be horizontally configured on the printed circuit board. It should also be appreciated that throughout this disclosure, describing a component as attached to a substrate may mean the component is attached directly to the substrate or to an intervening component (e.g., printed circuit board) that is directly or indirectly attached to the substrate.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

The invention claimed is:

1. An electrical switch comprising:
    a first electrical circuit contact;
    a second electrical circuit contact;
    an electrically conductive element, including a plurality of retaining features;

a shape-memory alloy actuator configured to:
  upon actuation in a first state, translate the electrically conductive element into contact with the first electrical circuit contact and out of contact with the second electrical circuit contact, and
  upon actuation in a second state, translate the electrically conductive element into contact with the second electrical circuit contact and out of contact with the first electrical circuit contact; and
a retention mechanism that includes the first electrical circuit contact or the second electrical circuit contact positioned within at least one retaining feature of the plurality of retaining features and is configured to:
  prevent the electrically conductive element from releasing contact with the first electrical circuit contact until the shape-memory alloy actuator is actuated to the second state; and
  prevent the electrically conductive element from releasing contact with the second electrical circuit contact until the shape-memory alloy actuator is actuated to the first state.

2. The electrical switch of claim 1, wherein the electrically conductive element is a conductive plunger.

3. The electrical switch of claim 1, wherein the electrically conductive element is a conductive wire.

4. The electrical switch of claim 1, wherein the electrically conductive element includes two conductive contacts.

5. The electrical switch of claim 1, wherein the shape-memory alloy actuator is connected to the electrically conductive element.

6. The electrical switch of claim 1, wherein the shape-memory alloy actuator is connected to a lever arm.

7. The electrical switch of claim 1, wherein:
the first electrical circuit contact and second electrical circuit contact are connected to springs.

8. The electrical switch of claim 1, wherein:
the retention mechanism includes the electrically conductive element and a pinion; and
the electrically conductive element includes gears that engage with the pinion.

9. The electrical switch of claim 1, wherein the retention mechanism includes magnets.

10. The electrical switch of claim 9, wherein:
the first electrical circuit contact includes a first set of contacts joined by a first magnet;
the second electrical circuit contact includes a second set of contacts joined by a second magnet; and
the electrically conductive element and a second electrically conductive element are joined by a third magnet.

11. The electrical switch of claim 1, wherein the shape-memory alloy actuator is constructed of nickel titanium.

12. A system comprising:
a first electrical circuit;
a second electrical circuit; and
an electrical switch including:
  a first electrical circuit contact;
  a second electrical circuit contact;
  an electrically conductive element that includes a plurality of retaining features;
  a shape-memory alloy actuator configured to:
    upon actuation in a first state, translate the electrically conductive element into contact with the first electrical circuit contact and out of contact with the second electrical circuit contact, and
    upon actuation in a second state, translate the electrically conductive element into contact with the second electrical circuit contact and out of contact with the first electrical circuit contact; and
  a retention mechanism includes the first electrical circuit contact or the second electrical circuit contact positioned within at least one retaining feature of the plurality of retaining features and is configured to:
    prevent the electrically conductive element from releasing contact with the first electrical circuit contact until the shape-memory alloy actuator is actuated to the second state; and
    prevent the electrically conductive element from releasing contact with the second electrical circuit contact until the shape-memory alloy actuator is actuated to the first state.

13. The system of claim 12, wherein the shape-memory alloy actuator is connected to a lever arm.

14. The system of claim 12, wherein:
the first electrical circuit contact and second electrical circuit contact are connected to springs.

15. The system of claim 12, wherein:
the retention mechanism includes the electrically conductive element and a pinion; and
the electrically conductive element includes gears that engage with the pinion.

16. The system of claim 12, wherein the retention mechanism includes magnets.

17. The system of claim 16, wherein:
the first electrical circuit contact includes a first set of contacts joined by a first magnet;
the second electrical circuit contact includes a second set of contacts joined by a second magnet; and
the electrically conductive element and a second electrically conductive element are joined by a third magnet.

18. The system of claim 12, wherein the shape-memory alloy actuator is constructed of nickel titanium.

19. An electrical switch comprising:
a first electrical circuit contact;
a second electrical circuit contact;
an electrically conductive element that includes gears; and
a shape-memory alloy actuator configured to:
  upon actuation in a first state, translate the electrically conductive element into contact with the first electrical circuit contact and out of contact with the second electrical circuit contact, and
  upon actuation in a second state, translate the electrically conductive element into contact with the second electrical circuit contact and out of contact with the first electrical circuit contact; and
a retention mechanism that includes the electrically conductive element and a pinion that engages with the gears of the electrically conductive element, the retention mechanism configured to:
  prevent the electrically conductive element from releasing contact with the first electrical circuit contact until the shape-memory alloy actuator is actuated to the second state, and
  prevent the electrically conductive element from releasing contact with the second electrical circuit contact until the shape-memory alloy actuator is actuated to the first state.

20. A system comprising:
a first electrical circuit;
a second electrical circuit; and
an electrical switch including:
  a first electrical circuit contact;
  a second electrical circuit contact;
  an electrically conductive element that includes gears;

a shape-memory alloy actuator configured to:
  upon actuation in a first state, translate the electrically conductive element into contact with the first electrical circuit contact and out of contact with the second electrical circuit contact, and
  upon actuation in a second state, translate the electrically conductive element into contact with the second electrical circuit contact and out of contact with the first electrical circuit contact; and
a retention mechanism that includes the electrically conductive element and a pinion that engages with the gears of the electrically conductive element, the retention mechanism configured to:
  prevent the electrically conductive element from releasing contact with the first electrical circuit contact until the shape-memory alloy actuator is actuated to the second state, and
  prevent the electrically conductive element from releasing contact with the second electrical circuit contact until the shape-memory alloy actuator is actuated to the first state.

* * * * *